(12) United States Patent
Hansma

(10) Patent No.: US 6,544,458 B1
(45) Date of Patent: Apr. 8, 2003

(54) METHOD FOR PREPARING CERAMIC MATERIAL WITH HIGH DENSITY AND THERMAL SHOCK RESISTANCE

(75) Inventor: Arnold Hansma, Burlington (CA)

(73) Assignee: A. H. Casting Services Limited, Burlington (CA)

(*) Notice: Subject to any disclaimer, the term of this patent is extended or adjusted under 35 U.S.C. 154(b) by 0 days.

(21) Appl. No.: 09/515,456

(22) Filed: Feb. 29, 2000

Related U.S. Application Data

(60) Division of application No. 08/658,818, filed on May 31, 1996, now abandoned, which is a continuation-in-part of application No. 08/463,310, filed on Jun. 2, 1995, now abandoned.
(60) Provisional application No. 60/006,734, filed on Nov. 14, 1995.

(51) Int. Cl.$^7$ .......................... B29B 15/00; B29C 71/00
(52) U.S. Cl. ....................................... 264/234; 264/237
(58) Field of Search ................................. 264/234, 662, 264/665, 232, 237

(56) References Cited

U.S. PATENT DOCUMENTS

| | | | |
|---|---|---|---|
| 3,871,745 A | * | 3/1975 | Waku et al. |
| 3,887,524 A | | 6/1975 | Kirchner et al. |
| 4,423,353 A | | 12/1983 | Ogata et al. |
| 4,468,590 A | | 8/1984 | Akutsu et al. |
| 4,495,116 A | | 1/1985 | Kaneno et al. |
| 4,752,515 A | | 6/1988 | Hosoi et al. |
| 4,778,778 A | | 10/1988 | Mallia et al. |
| 4,800,320 A | | 1/1989 | Kajihara et al. |
| 4,806,826 A | | 2/1989 | White et al. |
| 4,835,123 A | | 5/1989 | Bush et al. |
| 4,900,703 A | | 2/1990 | Ono et al. |
| 5,006,492 A | | 4/1991 | Semen et al. |
| 5,134,098 A | | 7/1992 | Shaffer |
| 5,139,979 A | | 8/1992 | Anderson et al. |
| 5,173,349 A | | 12/1992 | Yavuz et al. |
| 5,322,111 A | | 6/1994 | Hansma |
| 5,334,563 A | | 8/1994 | Garvie |
| 5,342,564 A | | 8/1994 | Wei et al. |
| 5,352,643 A | | 10/1994 | Staechler et al. |
| 5,824,262 A | * | 10/1998 | Kim et al. |

FOREIGN PATENT DOCUMENTS

GB     1597162     9/1981

OTHER PUBLICATIONS

Clarke (1992) J. Am. Ceram. Soc. 75(4):739–59.
Evans (1990) J. Am. Ceram. Soc. 73(2):187–206.
Hasselman et al. (1988) Advanced Ceramics II, Ed. S. Soiniya, Elsevier Applied Science, Barkign, Essex, UK, pp. 193–217.
Swain (1988) Advanced Ceramics II, Ed. S. Soiniya, Elsevier Applied Science, Barkign, Essex, UK, pp. 45–67.
Marshall et al. (1987) Ceramic Bulletin 66(2):309–17.
Evans et al. (1984) J. Am. Ceram. Soc. 67:255–60.

(List continued on next page.)

Primary Examiner—Christopher A. Fiorilla
(74) Attorney, Agent, or Firm—Klauber & Jackson

(57) ABSTRACT

A ceramic material is prepared which has a favorable combination of high density, and elevated modulus of elasticity and thermal shock resistance as measured by the ability to withstand temperature changes of at least 300° C. The ceramic material is prepared by subjecting a ceramic structure to at least one heat treatment providing the formation in the structure of controlled macro- and micro-cracks, and subjecting the structure processed in this fashion to further heating under static pressure to form the final ceramic material having the favorable combination of properties enumerated herein. The invention extends to the material, the method of its preparation and to a variety of products having predetermined properties that can be fabricated therefrom. For example, cylinder inserts for the manufacture of internal combustion engines, and packaging for integrated circuit devices may be prepared from the present ceramic material.

20 Claims, 13 Drawing Sheets

OTHER PUBLICATIONS

Evans et al. (1984) "Mechanical Behavior of Alumina: A Model Anisotropic Brittle solid, in Advances in Ceramics, V.10, Structure and Properties of MgO and $Al_2O_3$ Ceramics", ed W.D. Kingery. The American Ceramic Society, Inc., Columbus, OH, pp.: 697–719.
Kodaira et al. (1984) Ceramics International 10:56–8.
Budiansky et al. (1983) Int. J. Solids Structures 19:337–55.
McMeeking et al. (1982) J Am. Ceram. Soc. 65(5):242–6.
Heuer et al. (1980) J. Am. Ceram. Soc. 63:53–58.
Hoagland et al. (1980) J. Am. Ceram. Soc. 63:404–10.
Evans (1978) Acta Metallurgica 26:1845–53.
Rice (1977) Treatise Mater. Sci. Technol. 11:199–380.
Elber (1970) Eng. Frac. Mech. 2:37–45.
Hasselman et al. (1970) J. Am. Ceram. Soc. 53(9):490–5.
Davidge et al. (1968) J. Mater. Sci. 3:629–34.
(1993) Effect of heat treatment on phase composition and properties of modified alumina ceramics. Ceramic Abstracts, Am. Ceram. Soc., No. 07011698.
(1993) Processing and microstructure of Y–TZP/Al sub 2 O sub 3 fibers. Ceramic Abstracts, Am. Ceram. Soc., No. 07001587.
(1993) Effect of hydrolytic temperature on pore structure of alkoxide–derived aluminas. Ceramic Abstracts, Am. Ceram. Soc., No. 06905810.
(1993) Surface coating technique for revealing grain structures in alumina. Ceramic Abstracts, Am. Ceram. Soc., No. 06705055.
(1993) Hydrqtion of Na sub 2 multiplied by 5.5 (Ga sub x Al sub 1 sub—sub x)O sub 3 with the structure of beta–alumina. Ceramic Abstracts, Am. Ceram. Soc., No. 06606516.
(1993) Preparation of alumina fibers and changes in their microstructure caused by heat treatment. Ceramic Abstracts, Am. Ceram. Soc., No. 06207075.
(1993) Kinetics of phase change in explosively shock–treated alumina. Ceramic Abstracts, Am. Ceram. Soc., No. 06901815.
(1993) Quantitative analysis of high–alumina refractories using X–ray powder diffraction data and the Rietveld method. Ceramic Abstracts, Am. Ceram. Soc., No. 07003074.
(1993) Growth of beta–alumina (Na sub 2 O center dot 11Al sub 2 O sub 3) single crystals by the flux method. Ceramic Abstracts, Am. Ceram. Soc., No. 07001524.
(1993) Synthesis and properties of high–purity alumina. Ceramic Abstracts, Am. Ceram. Soc., No. 07213349.
(1993) Superaluminous ceramic for microwave utilizations. Ceramic Abstracts, Am. Ceram. Soc., No. 070011805.
(1993) Ceramic membranes, applications, and properties. Ceramic Abstracts, Am. Ceram. Soc., No. 07011671.
(1993) Alumina zirconia composites: fabrication and properties. Ceramic Abstracts, Am. Ceram. Soc., No. 0711658.
(1993) Production processes, properties, and applications for tabular alumina. Ceramic Abstracts, Am. Ceram. Soc., No. 07009285.
(1993) High–porosity alumina ceramics. Ceramic Abstracts, Am. Ceram. Soc., No. 07009212.
(1993) Colloidal properties of alumina. Ceramic Abstracts, Am. Ceram. Soc., No. 07009152.
(1993) Claus catalysts and alumina catalyst materials and their application. Ceramic Abstracts, Am. Ceram. Soc., No. 07009151.
(1993) Alumina in coatings. Ceramic Abstracts, Am. Ceram. Soc., No. 07009123.
(1993) Applications of ultrathin alumina substrates. Ceramic Abstracts, Am. Ceram. Soc., No. 07005460.
(1993) Use of dense alumina–alumina ceramic combination in total hip replacement. Ceramic Abstracts, Am. Ceram. Soc., No. 06910456.
(1993) Sintering of Technical–grade Alumina; I, Characterization of Ground Alumina Powders. Ceramic Abstracts, Am. Ceram. Soc., No. 06905867.
(1993) Processing and microstructure of Y–TZP/Al sub 2 O sub 3 fibers. Ceramic Abstracts, Am. Ceram. Soc., No. 06904896.
(1993) Mechanical properties of hot–pressed alumina sialon composites. Ceramic Abstracts, Am. Ceram. Soc., No. 06903478.
(1993) Extrusion of Al sub 2 o sub 3 ceramics with low organic content. Ceramic Abstracts, Am. Ceram. Soc., No. 06901372.
(1993) Effect of MgO characteristics as additive on gamma–Al sub 2 O sub 3 properties. Ceramic Abstracts, Am. Ceram. Soc., No. 06805283.
(1993) Alumina fiber structure. Ceramic Abstracts, Am. Ceram. Soc., No. 06803584.
(1993) Physical characteristic of Na and (Na–K) beta–beta double prime aluminas. Ceramic Abstracts, Am. Ceram. Soc., No. 06802873.
(1993) Formation and properties of 2Tb sub 2 O sub 3 –Al sub 2 O sub 3. Ceramic Abstracts, Am. Ceram. Soc., No. 06801268.
(1993) Tough valves with ceramics. Ceramic Abstracts, Am. Ceram. Soc., No. 6708651.
(1993) Properties of layered–granule ceramics of aluminum oxide. Ceramic Abstracts, Am. Ceram. Soc., No. 6708618.
(1993) Properties and sinterability of high–purity alumina fine powders. Ceramic Abstracts, Am. Ceram. Soc., No. 6708617.
(1993) Properties of the samples of the system Al sub 2 O sub 3 –B sub 4 C made by hot–pressing. Ceramic Abstracts, Am. Ceram. Soc., No. 6707042.
(1993) Effects of Na sub 2 O content on characteristics of beta –Al sub 2 O sub 3. Ceramic Abstracts, Am. Ceram. Soc., No. 6704991.
(1993) Fired properties of zircon–alumina mixes. Ceramic Abstracts, Am. Ceram. Soc., No. 06402769.
(1993) Properties of alumina samples prepared form homogeneous solutions using various precipitating agents. Ceramic Abstracts, Am. Ceram. Soc., No. 06402718.
(1993) Relation between hardness, elasticity, and density characteristics of aluminum oxide specimens prepared by hot–pressing. Ceramic Abstracts, Am. Ceram. Soc., No. 06401251.
(1993) Effects of processing parameters on the properties of porous alumina ceramics. Ceramic Abstracts, Am. Ceram. Soc., No. 06202488.
(1993) Properties of the chemically vapor deposited alumina thin film and powder on heat treatment. Ceramic Abstracts, Am. Ceram. Soc., No. 07001598.
(1993) Pressure slip casting of submicron alumina powder. Ceramic Abstracts, Am. Ceram. Soc., No. 07214051.
(1993) Granulation and dry–pressing of Al sub 2 O sub 3 fine powder. Ceramic Abstracts, Am. Ceram. Soc., No. 07213953.

(1993) Dihedral angle measurements in alumina ceramics by stereo transmission. Ceramic Abstracts, Am. Ceram. Soc., No. 07213514.
(1993) Rheology of porous alumina and simulation of hot isotatic pressing. Ceramic Abstracts, Am. Ceram. Soc., No. 07112349.
(1993) Structural properties of ceramic alumina microfiltration membranes as a function of sintering time and temperature. Ceramic Abstracts, Am. Ceram. Soc., No. 07011801.
(1993) Effect of forming pressure on the internal structure of alumina green bodies examined with immersion liquid technique. Ceramic Abstracts, Am. Ceram. Soc., No. 07011697.
(1993) Corrosion of alumina in acids. Ceramic Abstracts, Am. Ceram. Soc., No. 07011683.
(1993) Phase equilibria of alumina. Ceramic Abstracts, Am. Ceram. Soc., No. 07009261.
(1993) Dynamic mechanical properties of $Al_2O_3$ ceramic systems. Ceramic Abstracts, Am. Ceram. Soc., No. 07009176.
(1993) Dispersion and consolidation of the colloidal suspension in the $Al_2O_3$ powder– $Si_3N_4$ whisker system. Ceramic Abstracts, Am. Ceram. Soc., No. 07009174.
(1993) Computer modeling of the densification of alumina. Ceramic Abstracts, Am. Ceram. Soc., No. 07009156.
(1993) Determination of the thermal conductivity of polycrystalline alumina [PCA] and yttrium aluminum garnet [YAG] in the temperature range 300–1500 K. Ceramic Abstracts, Am. Ceram. Soc., No. 07008308.
(1993) Elastic behavior of partially sintered alumina. Ceramic Abstracts, Am. Ceram. Soc., No. 07006804.
(1993) Free–surface velocity measurement of shock–compressed alumina powder. Ceramic Abstracts, Am. Ceram. Soc., No. 07004165.
(1993) Effect of stress state and microstructural parameters on impact damage of alumina–based ceramics. Ceramic Abstracts, Am. Ceram. Soc., No. 07001507.
(1993) Pressureless–sintered $Al_2O_3$—TiC composites. Ceramic Abstracts, Am. Ceram. Soc., No. 06907998.
(1993) High–pressure self–combustion sintering [HPCS] of alumina–titanium carbide ceramic composite. Ceramic Abstracts, Am. Ceram. Soc., No. 06906046.
(1993) Slip casting and sintering of high–purity alumina. Ceramic Abstracts, Am. Ceram. Soc., No. 06905869.
(1993) Forming of alumina and silicon carbide powders by new powder forming method, cyclic CIP. Ceramic Abstracts, Am. Ceram. Soc., No. 06905569.
(1993) Application of high–purity alumina castables in gas reforming furnaces. Ceramic Abstracts, Am. Ceram. Soc., No. 06904700.
(1993) Wettability of monocrystalline alumina by aluminum between its melting point [993 K] and 1273 K. Ceramic Abstracts, Am. Ceram. Soc., No. 06901857.
(1993) Hot isostatic pressing of alumina and examination of the hot isostatic pressing map. Ceramic Abstracts, Am. Ceram. Soc., No. 06901386.
(1993) Effect of heat treatment on phase composition and properties of modified alumina ceramics. Ceramic Abstracts, Am. Ceram. Soc., No. 06809413.
(1993) Hot isostatic pressing of alumina. Ceramic Abstracts, Am. Ceram. Soc., No. 06807361.

(1993) Preparation of $Al_2O_3$ ceramics by low–pressure injection. Ceramic Abstracts, Am. Ceram. Soc., No. 06805355.
(1993) Hot–pressing synthesis of an $Al_2O_3$ AlON composite. Ceramic Abstracts, Am. Ceram. Soc., No. 06805311.
(1993) Dimensional change during die compacting and sintering of spray–dried alumina ceramic granules. Ceramic Abstracts, Am. Ceram. Soc., No. 06805280.
(1993) Sliding wear of 97.5% alumina and 99.5% alumina ceramic against polycrystalline silicon carbide. Ceramic Abstracts, Am. Ceram. Soc., No. 06803714.
(1993) Transparent alumina in lighting technology. Ceramic Abstracts, Am. Ceram. Soc., No. 0683574.
(1993) Packing density of alumina blends for substrates evaluates from pressure filtered–pressed compacts. Ceramic Abstracts, Am. Ceram. Soc., No. 06803524.
(1993) Formation of microcrystalline alpha–alumina by glycothermal treatment of gibbsite. Ceramic Abstracts, Am. Ceram. Soc., No. 0683493.
(1993) Compressive fracture processes in an alumina glass composite. Ceramic Abstracts, Am. Ceram. Soc., No. 06803473.
(1993) Sinterability of alumina prepared by thermal decomposition of Al–isopropoxide. Ceramic Abstracts, Am. Ceram. Soc., No. 06801334.
(1993) Effects of HIP treatment on densification and grain growth of alumina. Ceramic Abstracts, Am. Ceram. Soc., No. 06801255.
(1993) Preparation of $Al_2O_3$ ceramics by low–pressure injection molding. Ceramic Abstracts, Am. Ceram. Soc., No. 06706807.
(1993) Catalytic activity of $Al_2O_3$ treated with $CF_3Cl$ for vapor–phase reactions of benzene with compounds containig $CF_3$ group. Ceramic Abstracts, Am. Ceram. Soc., No. 06704967.
(1993) High–temperature diffusion bonding for sintered alumina: II, Evaluation of bonding strength and microstructure. Ceramic Abstracts, Am. Ceram. Soc., No. 06703322.
(1993) High–temperature diffusion bonding for sintered alumina: I, size change and deformation in bonding process. Ceramic Abstracts, Am. Ceram. Soc., No. 0673321.
(1993) Fracture strength in low–temperature flux bonding of sintered alumina. Ceramic Abstracts, Am. Ceram. Soc., No. 06703315.
Ohtake et al. (1993) Fracture toughness of high–pressure–sintered compacts from a mixture of alumina and wurtzite–type boron nitride. Ceramic Abstracts, Am. Ceram. Soc., No. 06608541.
(1993) Sintered $Al_2O_3$–SiC–whisker composites. Ceramic Abstracts, Am. Ceram. Soc., No. 06608396.
Kodaira et al. (1993) Pressure sintering of $Al_2O_3$ – MgO mixtures under 10 kbar. Ceramic Abstracts, Am. Ceram. Soc., No. 06602834.
(1993) Dynamic uniaxial stress experiments on alumina with in–material Manganin gauges. Ceramic Abstracts, Am. Ceram. Soc., No. 06602791.
(1993) High–pressure compaction of alumina powders. Ceramic Abstracts, Am. Ceram. Soc., No. 06601140.
(1993) Irreversible dilation on heating pressed pellets of alumina powder. Ceramic Abstracts, Am. Ceram. Soc., No. 06407473.

(1993) Indentification of hot–pressing conditions producing optimum strength and microstructure in alumina. Ceramic Abstracts, Am. Ceram. Soc., No. 06407116.

(1993) Electrical properties of alpha –Al sub 2 O sub 3. Ceramic Abstracts, Am. Ceram. Soc., No. 06406553.

(1993) Interface–reaction–controlled kinetics in the hot isostatic pressing of submicrometer alumina powder. Ceramic Abstracts, Am. Ceram. Soc., No. 06405743.

(1993) Rapid solidification in the Al sub 2 O sub 3 –ZrO sub 2 system. Ceramic Abstracts, Am. Ceram. Soc., No. 06404325.

(1993) Creep in polycrystalline Al sub 2 O sub 3 :Si. Ceramic Abstracts, Am. Ceram. Soc., No. 06404257.

(1993) X–ray diffraction line–broadening studies on shock–modified rutile and alumina. Ceramic Abstracts, Am. Ceram. Soc., No. 06402844.

(1993) Fracture criterion for alumina ceramics subjected to triaxial stresses. Ceramic Abstracts, Am. Ceram. Soc., No. 06401215.

(1993) Effect of wxygen partial pressure on the properties of rf–sputtered Al sub 2 O sub 3 thin films. Ceramic Abstracts, Am. Ceram. Soc., No. 06401205.

(1993) Effect of processing parameters on the surface area of freeze–dried and spray–dried alumina. Ceramic Abstracts, Am. Ceram. Soc., No. 06401125.

(1993) Restrictive diffusion in alumina. Ceramic Abstracts, Am. Ceram. Soc., No. 06307103.

(1993) Kinetics of polymorphous transfromation and its effect on the sintering mechanism of aluminum oxide. Ceramic Abstracts, Am. Ceram. Soc., No. 06305847.

(1993) Compaction behavior of spray–dried alumina. Ceramic Abstracts, Am. Ceram. Soc., No. 06305645.

(1993) Solid–state metal–ceramic bonding of platinum to alumina. Ceramic Abstracts, Am. Ceram. Soc., No. 06303875.

(1993) Multiaxial loading fracture of Al sub O sub 3 tubes: II, Weibull theory and analysis. Ceramic Abstracts, Am. Ceram. Soc., No. 06303468.

(1993) Three–dimensional approach to the electrolytic degradation of solid electrolytes. Ceramic Abstracts, Am. Ceram. Soc., No. 06207153.

(1993) Fabrication of steel–alumina joints by diffusion bonding. Ceramic Abstracts, Am. Ceram. Soc., No. 06206569.

(1993) Hydration of lithium beta–alumina. Ceramic Abstracts, Am. Ceram. Soc., No. 06203215.

(1993) Electrical resistivity of certain aluminum oxide–containing cermets. Ceramic Abstracts, Am. Ceram. Soc., No. 06201205.

(1993) CVD of alumina on cutting tool inserts from AlCl sub 3 –Hsub 2–co sub 2 mixtures—influence of CVD parameters and nature of the inserts on morphology and wear resistance. Ceramic Abstracts, Am. Ceram. Soc., No. 06201189.

(1993) Stability of beta –Al sub/2/O sub/3/ (Na sub /2/ O multiplied by 11Al sub /2/ O sub /3/3) in oxygen atmospheres. Ceramic Abstracts, Am. Ceram. Soc., No. 06105498.

(1993) Hot–pressing of alumina–talc compositions. Ceramic Abstracts, Am. Ceram. Soc., No. 06105405.

(1993) Electrical characteristics of rf–sputtered Al sub 2 O sub 3 MIM structures. Ceramic Abstracts, Am. Ceram. Soc., No. 06104983.

(1993) Properties of high alumina refractories after exposure to steam /H sub/ 2J atmospheres. Ceramic Abstracts, Am. Ceram. Soc., No. 06103195.

(1993) Hydrostatic pressing of ceramic pipes based on Al sub 2 O sub 3. Ceramic Abstracts, Am. Ceram. Soc., No. 06103125.

* cited by examiner

METHOD FOR PREPARING CERAMIC MATERIAL WITH HIGH DENSITY AND THERMAL SHOCK RESISTANCE

CROSS-REFERENCE TO RELATED APPLICATIONS

The present application is a divisional of application Ser. No. 08/658,918, filed May 31, 1996, now abandoned which is a Continuation-In-Part of application Ser. No. 08/463,310, filed Jun. 2, 1995 now abandoned, and Provisional Application Serial No. 60/006,734, filed Nov. 14, 1995, both by the inventor herein. Priority is claimed under 35 U.S.C. §120 as to the earlier filed applications, and the disclosures thereof are incorporated herein by reference.

BACKGROUND OF THE INVENTION

The present invention relates generally to ceramic materials and specifically to such materials and their preparation to achieve increased density and thermal shock resistance.

DESCRIPTION OF THE PRIOR ART

Ceramic materials are increasingly becoming an integral part of modern industry. Applications of novel advanced ceramic materials can provide significant economies, increase productivity and expand product markets. Industry requires materials which have both high strength at room temperature and high strength at elevated temperatures that resist deformation, are damage tolerant, and that resist cracking, corrosion and erosion where thermal stress and mechanical stress is a factor. Usually the thermal shock resistance of high density ceramic materials is relatively low. New materials are being developed worldwide using a number of principles relating to different-compositions and several different structural characteristics, including atomic, electronic, grain boundary, micro-structure, and macro-structure.

Certain ceramic products are desirably fabricated from high purity materials, e.g., materials that are substantially entirely comprised of a particular ceramic component or material. Such materials are polycrystalline in structure and are utilized for such products as the fabrication of cutting tools and other applications where wear resistance is an important property and capability. Representative techniques for the preparation of such high density materials include those set forth in U.S. Pat. No. 5,342,564 to Wei et al. Wei et al. propose to prepare alumina-titanium carbide composites of high density by a specific rapid sintering regime which heats the green body in question to a temperature up to which thermal shock is experienced. Generally, however, improvements in properties such as thermal shock resistance and fracture toughness can only be achieved, if at all, by substantial doping with other ceramic or refractory materials such as titanium carbide. Moreover, the process so disclosed is careful to control heating so as to avoid thermal shock of the green body, and clearly, is neither expected to achieve nor actually achieves any improvements in these properties.

One of the drawbacks in the processing of high density ceramic materials of the type described is the development of extensive crack propagation and corresponding susceptibility to fracture in use. For example, the fabrication from ceramic materials of metal casting sleeves of the type regularly utilized in the fabrication of automotive parts, involves a highly critical and correspondingly expensive fabrication owing to the tendency of the dense body to develop unwanted cracks and fractures in fabrication. Generally, such sleeves are first fabricated, then cooled to shrink-fit them into the casings into which they are disposed for use. In use, the bodies experience extreme temperature fluctuations and because of their high density and corresponding susceptibility to thermal shock damage, must be frequently replaced, at great cost to the manufacturer in terms of equipment and downtime. At the same time, however, the density of materials utilized as shot sleeves must necessarily be high, and, in fact, as close to theoretical as possible, so that these materials will withstand the abrasive forces of a continuous casting process.

U.S. Pat. No. 3,887,524 to Kirchner et al. seeks to prepare an alumina body with a combination of improved strength and thermal shock properties, and employs a quenching procedure where the body is fired up to temperatures on the order of 1750° C. and is then quenched in a liquid quenching medium held at a temperature below about 250° C. This specific quenching medium is an emulsion of oil with water, and several oils are proposed and illustrated. The materials prepared in accordance with Kirchner et al., however, did not purport to exhibit the high density characteristics of products of interest herein and, in fact, by the flexural strength properties revealed, would not be expected to so perform. This same problem is reflected in U.S. Pat. No. 5,139,979 to Anderson et al. where aluminum titanate composites are prepared, which are purported to offer the properties of improved thermal shock resistance, high mechanical strength and low coefficient of thermal expansion. As reflected in Table 4 of Anderson et al., materials prepared with the described properties set forth by the patentees exhibited densities that were substantially lower than theoretical. This further evidences the understanding in the art that the properties of high density and improved thermal shock resistance are generally incapable of conjoint achievement in a single ceramic body.

As both properties are desirably achieved, and particularly inasmuch as the combination of these properties would yield a material having a broad range of commercial and other industrial applications, a need is therefore perceived to exist which is believed to be fulfilled by the present invention as set forth below.

SUMMARY OF THE INVENTION

In accordance with the present invention, a ceramic material is disclosed which exhibits a combination of properties not found in any known ceramic materials. Specifically, the ceramic materials of the present invention exhibit a combination of extremely high density approaching theoretical levels, together with an increased modulus of elasticity and, notably, increased thermal shock resistance as measured by the ability of the ceramic material to withstand a change in its temperature of 300° C. or greater, as is caused by the rapid upquenching of said ceramic material, without the development by the ceramic material or a structure formed from it, of extensive fracture or like structural degradation. Exemplary ceramic materials include alumina, zirconia, titania, thoria, silica, magnesia, calcia, nitrides thereof, carbides thereof, aluminum nitride, silicon nitride, boron nitride, boron carbide, and mixtures thereof, with alumina, aluminum nitride and silicon nitride being particularly exemplary. In a particular embodiment, the ceramic material comprises alumina, and more particularly, alumina of 85%, 96% and 98.8% purity, respectively. As illustrated herein, densities on the order of 3.8 g/cm$^3$ and thermal shock resistance of 650° C. or greater are attained by the within invention. The invention also extends to composites prepared with materials such as alumina, zirconia, magnesia, silica and calcia. Also, mixtures of materials are contemplated, so that, for example, composites prepared to contain 75% to 90% alumina, remainder zirconia, are included.

A ceramic structure or product in accordance with the invention is prepared by a process which comprises, in a first embodiment:

(A) forming the ceramic structure;

(B) applying a pressure or stress to the ceramic structure of Step (A) on the order of 50,000 psi as determined in relation to the size and shape of said ceramic structure, and a particular K factor relating to modulus of elasticity;

(C) concurrently with step (B), adjusting the temperature of said ceramic structure to a level on the order of 650° C. or other source of energy of activation up to and exceeding the elastic limit of said material, as determined in relation to alumina and to a particular K factor relating to the heat capacity, thermal conductivity and thermal expansion of the ceramic structure; and (D) performing the treatment in accordance with the conditions of Steps (B) and (C) at a frequency of at least once and for a period sufficient to reach temperature equilibrium within said ceramic structure, and to thereby achieve the pressure parameter of at least the magnitude of Step (B).

A similar process that may be practiced in accordance with the method of preparation of the present invention comprises:

(A) providing a ceramic structure and subjecting it to at least one first heat treatment to promote the formation of controlled macro- and micro-fracture domains therein; and (B) subjecting the ceramic structure treated in accordance with Step (A) to at least one second heat treatment while placing said ceramic body under tangential static pressure to cause the conversion of the ceramic body to an anisotropic polycrystalline form.

The method of the last mentioned embodiment comprises a first heating of the initial ceramic body at a temperature of up to about 1200° C., followed by a cooling of the heat treated body to ambient, or to a temperature of about 20° C. Both heating and cooling may desirably be performed rapidly and, for example, may be conducted at a rate as high as 100° C. per second. Heating may take place in air, while cooling may be conducted by means of a liquid medium, such as water. In such event, the cooled body may thereafter be dried.

The second stage or step of the process involves the application of heat and pressure which is believed to result in the change of the crystal structure of the ceramic material. Specifically, Step (B) of the process involves the heating of the ceramic body to temperatures of up to about 1200° C. while applying pressure or stress, and more particularly, stress in amounts ranging from about 10,000 psi to about 280,000 psi, and more particularly, from about 60,000 psi to about 150,000 psi, and most preferably, at a level of at least 90,000 psi. The performance of this second treatment step is believed to yield a change in the crystal structure of the resulting ceramic body not previously observed. More importantly, the resulting ceramic body develops the optimal density, strength and thermal shock resistance reflective of the present invention.

Both steps of the process may desirably be performed a plurality of times, and particularly the second step has been found to yield favorable improvements in all desired properties by such repeated performance.

The invention also extends to the treatment of previously formed ceramic structures and products, in which embodiment the below procedure may be followed:

(A) applying a stress or pressure to said ceramic structure, on the order of 50,000 psi as determined in relation to the size and shape of said ceramic structure, and a particular K factor relating to modulus of elasticity;

(B) concurrently with step (A), adjusting the temperature of said ceramic structure to a level on the order of 650° C. or other source of energy of activation up to and exceeding the elastic limit of said material, as determined in relation to alumina and to a particular K factor relating to the heat capacity, thermal conductivity and thermal expansion of the ceramic structure; and (C) performing the treatment in accordance with the conditions of Steps (A) and (B) at a frequency of at least once and for a period sufficient to reach temperature equilibrium within said ceramic structure, and to thereby achieve the pressure parameter of at least the magnitude of Step (A).

In a yet further embodiment of the present invention, the method for the preparation of a ceramic body having the favorable combination of high density, increased modulus of elasticity and increased thermal shock resistance is prepared by a first heating step wherein the ceramic body is exposed to flash heating to a temperature of about 675° C., flash cooling of the same, and subsequent heat treating of the material for stabilization at a temperature that may range from about 1100 to about 1300° C. The thus treated ceramic body may then be placed under a pressure of at least 90,000 psi while being subjected to thermal cycling at a temperature of up to about 660° C., to confer the final favorable combination of properties on the resulting ceramic body.

The repetition of the process which may be modulated and monitored by intermittent measurement of the ceramic body to ascertain its properties may be achieved at predetermined levels. The rapid upquenching referred to herein and in the claims may be effected by the exposure of the surface of the ceramic material to contact with eg. molten aluminum, in the same fashion as when molten metal is poured against the surface of a ceramic shot sleeve during a metal casting operation; In this connection, the invention extends to articles useful in metal casting procedures, such as the cylindrical shot sleeve that is conventionally employed in engine fabrication.

Likewise, the imposition of stress as is practiced in accordance with the present invention achieves the favorable development of anisotropic properties in the resulting body, that further advance other favorable characteristics as electrical conductivity and the like. Among the properties that are exhibited by the ceramic bodies prepared in accordance with the present invention are a reduction in crystal volume together with increases in thermal shock resistance and in the number of micro-cracks per unit volume and their homogeneity of distribution, as well as increased density and improved corrosion, erosion and abrasion resistance.

Thus, ceramic bodies produced in accordance with the present invention have a full array of favorable properties that commends their application to favorably diverse product areas. For example, the ceramic bodies of the present invention may be utilized for aluminum die casting or extrusion; chemical manufacturing, and specifically, ingredients for the preparation of chemical composites and equipment used in chemical processing where, particularly, inert materials are desirably used to reduce contamination of endproducts; aerospace applications, such as heat shields, turbine blades, seals, nozzles, and like structures; medical and scientific products, including manufacturing equipment for the production of pharmaceutical products as well as prosthetic devices, scientific instrument components and laboratory hardware; electronic and electrical products, such as packaging of integrated circuits, electro-optical devices, piezoelectric devices, substrates, resistors, thermistors and the like; and ceramic molding and cutting tools. In each instance, the particular characteristics of the resulting body may be predetermined and explicitly achieved to maximize the applicability of the resulting body to suit the specific industrial application.

More particularly, the invention extends to the preparation of cylinders for use in the manufacture of, e.g., internal combustion engines, such as for automobiles, trucks, industrial equipment, and other applications where motive power of this type is employed. The manufacture of an internal combustion engine often involves the casting of the primary components such as the engine block. In turn, the casting operation of the engine block includes the definition of the cylinder chamber by placing a cylindrical piece inside the mold against which the metal will be cast. This cylindrical piece is conventionally prepared from a ceramic composition that must exhibit sufficient density and thermal shock resistance to maintain its dimensional stability and integrity through repeated casting procedures. The advantage of the present invention is that inserts prepared hereby exhibit significantly improved stability and useful life.

The invention accordingly extends to a cylindrical body or insert for use in the manufacture of an internal combustion engine, which cylindrical insert is prepared from a ceramic material exhibiting a combination of near-theoretical density, increased modulus of elasticity and increased thermal shock resistance as measured by the ability to withstand a temperature difference greater than 300° C.

A further advantage of the ceramic materials of the invention that has been noted generally is that their improved thermal shock resistance yields a corresponding improvement in electrical properties, such as, for example, improved electrical loss factor and capacitance. Accordingly, the present ceramic materials are particularly useful for the preparation of ceramic structures which include integrated circuits. Such structures are also known as microchips, and the present materials may therefore be used in ceramic packaging manufacture.

The present method may be rapidly performed within, for example, a matter of hours, to achieve the ceramic bodies having the desired combination of properties.

Accordingly, it is a principal object of the present invention to provide a ceramic body having a desirable combination of high density and high resistance to thermal shock damage.

It is a further object of the present invention to provide a ceramic material as aforesaid that may be particularized as to its properties during processing with predictability and economy.

It is a yet further object of the present invention to provide a ceramic material as aforesaid that offers a diversity of favorable properties commending broad usage in a variety of industrial and technical applications.

It is a still further object of the present invention to provide a method for the preparation of a ceramic body as aforesaid, which method is capable of rapid and economic practice.

It is a still further object of the present invention to provide a variety of products having broad industrial applications, by fabrication from a ceramic material prepared in accordance with the present invention.

Other objects and advantages will become apparent to those skilled in the art from a review of the ensuing description which proceeds with reference to the following illustrative drawings.

BRIEF DESCRIPTION OF THE DRAWINGS

FIG. 9 depicts the Al K-edge absorption spectrum in the near edge region for the UPQ sample.

FIG. 10 shows an Al K-edge absorption spectrum in the near edge region for the OTS sample.

FIG. 11 presents a comparison of FIGS. 9 and 10 in the 1572–1600 eV region where a small difference in the absorption spectrum is noted.

FIG. 12 presents a comparison of the first derivative of the region shown in FIG. 11.

FIG. 13 is a comparison between TS and UPQ2TSY with one back ground adjusted.

DETAILED DESCRIPTION OF THE PREFERRED EMBODIMENTS

Figure 1:
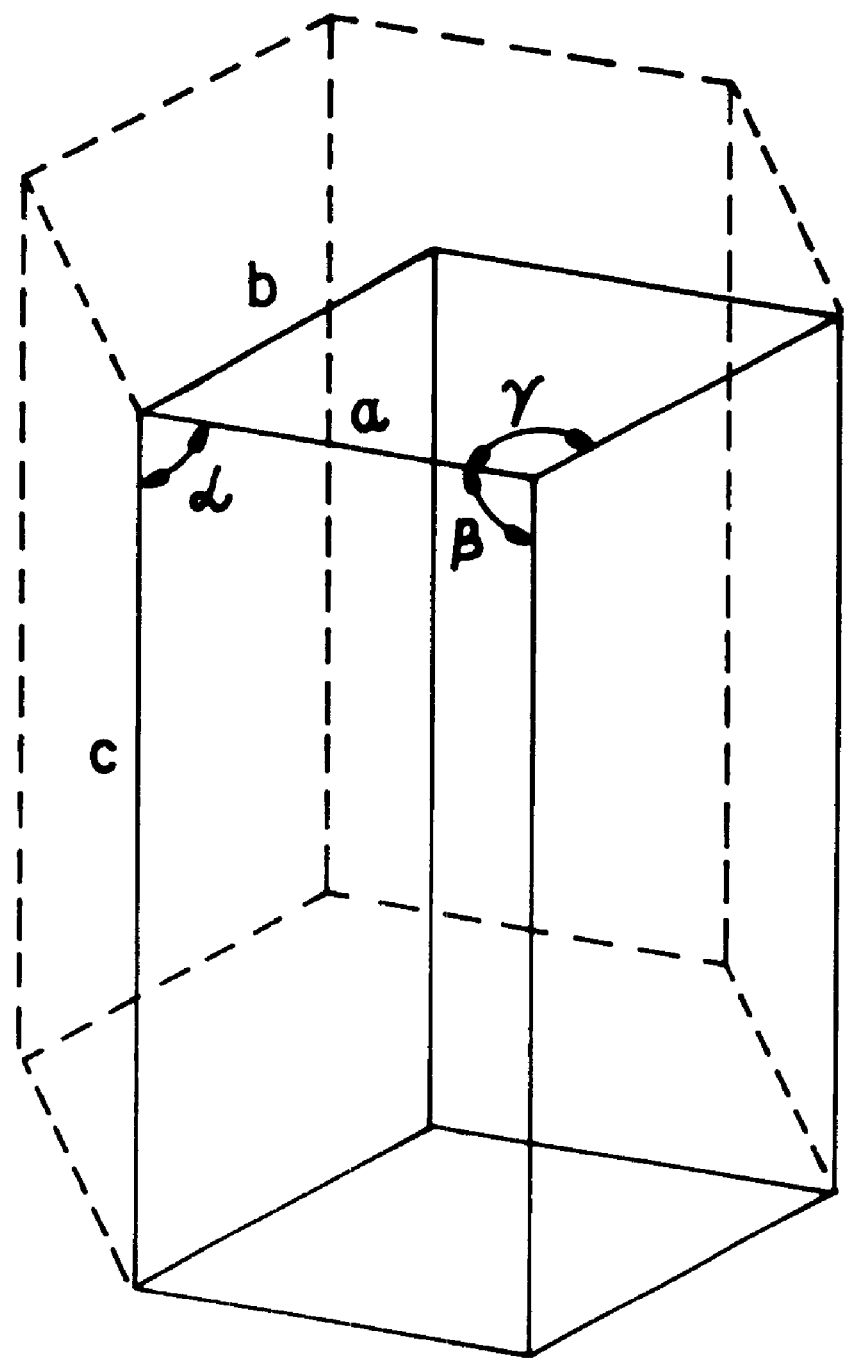
FIG. 1 is a schematic diagram depicting a model of ceramic crystal structure illustrating the practice of the present invention.

The present invention relates to a ceramic material and article that as prepared herein possesses a combination of improved properties that render it significantly better suited for a variety of structural and electrical applications. The ceramic article of the invention exhibits a combination of high, near-theoretical density, increased modulus of elasticity, and increased thermal shock resistance, which thermal shock resistance is measured by the ability of a structure formed from the ceramic material to withstand a change in its temperature of greater than about 300° C., and more particularly, a temperature change of greater than 650° C., without cracks forming therein. Such a temperature change is caused by the rapid upquenching of the ceramic material, which as illustrated herein, can occur by the application to the surface of the ceramic material of a flow of molten metal, such as molten aluminum. Ceramic materials not prepared in accordance with the present invention will develop cracks and fissures, will spall and disintegrate when so treated.

In a particular embodiment, ceramic materials prepared from alumina in accordance with the invention exhibit for example, modulus of elasticity of at least 359 GPa, and densities on the order of 3.8 g/cm$^3$. The ability to withstand temperature changes of at least 650° C. has also been attained with inventive ceramic formulations.

Suitable ceramic materials may be prepared from all such materials as are known, including alumina, zirconia, titania, thoria, silica, magnesia, calcia, nitrides thereof, carbides thereof, aluminum nitride, silicon nitride, boron nitride, boron carbide, cordierite, sialon, and mixtures thereof. Particular materials illustrated in non-limiting fashion herein include alumina, aluminum nitride and silicon nitride, with a particular composition being based on commercial alumina, which includes grades of 85 wt %, 96 wt % and 98.8 wt % $Al_2O_3$, respectively. A representative alumina composition comprises 98.8 wt. % $Al_2O_3$, balance essentially comprising MgO, $SiO_2$, $CaO_2$. Contemplated materials would include both those individual materials formulated homogeneously as well as other composite materials where, for example, a body may be prepared from a composition having the preponderance of a first ceramic element which, however, is doped with the addition of a second element. A particular example would include an alumina body doped with zirconia.

A feature of the ceramic materials of the present invention is the development of a unique crystalline structure and consequently, a new structural state. This state is believed to confer the combination of high density and improved, enhanced thermal shock resistance that has not previously been observed in ceramic materials of this kind. This favorable combination of properties exhibited by ceramic materials prepared in accordance with the present invention is in large measure conferred by the process for the treatment of such bodies, which includes the following steps:

(A) applying a tangential stress or pressure to the ceramic material, on the order of 50,000 psi as determined in relation to the size and shape of the ceramic material, and a particular K factor relating to modulus of elasticity;

(B) concurrently with step (A), adjusting the temperature of said ceramic material to a level on the order of 650° C. or other source of energy of activation up to and exceeding the elastic limit of said material, as determined in relation to alumina and to a particular K factor relating to the heat capacity, thermal conductivity and thermal expansion of the ceramic material; and (C) performing the treatment in accordance with the conditions of Steps (A) and (B) at a frequency of at least once and for a period sufficient to reach temperature equilibrium within the ceramic material, and to thereby achieve the pressure parameter of at least the magnitude of Step (A).

The above process may be applied as stated to already formed ceramic bodies and structures, to potentiate their structure and behavior, and in this connection, the method of the invention may be included as a series of steps that are performed as part of an otherwise conventional manufacturing process. Alternately, the method of the invention may include a method of manufacturing a ceramic material, where the material may be formed into a product or shape, and concomitant with that aspect of the manufacturing process, the above stated method may be performed.

Accordingly and in an alternate embodiment of the invention, a method for the preparation or manufacture of a ceramic article or structure having the improved properties of the present invention, may comprise:

(A) forming the ceramic structure;

(B) applying a stress to the ceramic structure of Step (A) on the order of 50,000 psi as determined in relation to the size and shape of ceramic structure, and a particular K factor relating to modulus of elasticity;

(C) concurrently with step (B), adjusting the temperature of said ceramic structure to a level on the order of 650° C. or other source of energy of activation up to and exceeding the elastic limit of said material, as determined in relation to alumina and to a particular K factor relating to the heat capacity, thermal conductivity and thermal expansion of the ceramic structure; and (D) performing the treatment in accordance with the conditions of Steps (B) and (C) at a frequency of at least once and for a period sufficient to reach temperature equilibrium within the ceramic structure, and to thereby achieve a pressure parameter of at least the magnitude of Step (B).

The method of the invention may be practiced in an alternate form wherein the ceramic material is prepared by:

(A) forming the ceramic body and subjecting it to at least one first heat treatment to promote the formation of controlled macro- and micro-fracture domains therein; and (B) subjecting the ceramic body treated in accordance with Step (A) to at least one second heat treatment while placing said ceramic body under pressure or stress to cause the conversion of the ceramic body to an anisotropic polycrystalline form.

In this embodiment, the first step (Step A) represents the initial conditioning of the ceramic body to develop the desirable uniformity and controlled propagation of limited micro- and macro-cracking that is preferred for ultimate attainment of favorable density and thermal shock resistance properties. Thus, the body is initially subjected to a heat treatment regime involving an initial preheating of the body up to a temperature of about 1200° C., and more preferably to a temperature of about 675° C., followed by a rapid cooling or downquenching of the body to temperatures on the order of about 20° C. This cooling or downquenching may be performed by immersion of the ceramic body in a cooling liquid or other contact with a cooling medium. In the instance where a cooling liquid is employed, such liquid may comprise water or other known cooling liquids, such as low barrier quenching liquids, or the like. The invention in this aspect is intended to extend to all such suitable cooling liquids within its spirit and scope.

More particularly, the first or conditioning heat treatment of the present process may be conducted a plurality of times and may likewise be performed at accelerated rates of temperature change, with an exemplary such rate being 100° C. per second. In the instance where a cooling liquid is employed, and the thermal cycling is completed, the body may then be dried and optionally exposed to a further heat treatment or thermal stabilization, which may be conducted at a temperature of about 1100° C. to about 1300° C.

The performance of this first heating step, as indicated, serves to set the stage for the preparation of a uniform ceramic body, as it is Applicant's observation that ceramic body and particularly those exposed to severe fluctuations in temperature frequently undergo extensive cracking and fracture in use. The development of the present invention arose in the context of efforts by Applicant to fabricate a shot sleeve useful in a molten metal die casting apparatus, such as that disclosed in Applicant's U.S. Pat. No. 5,322,111, the disclosure of which is incorporated herein by reference.

Applicant had found that the ceramic liners for such apparatus frequently fractured and were thereby limited in useful life, when exposed to the sudden application of extreme heat as occurs in the instance where molten metal is cast over the surface. Heretofore, the preparation of ceramic bodies capable of withstanding significant fluctuations in temperature have always been attended, however, by an unfavorable limitation and even a reduction in strength and density of the resulting body. Generally, the two properties in question have been mutually exclusive, and because of this, unwarranted and undesirable expense in terms of downtime and refitting are experienced by industrial concerns engaged in the use of casting equipment of the type mentioned. It was in this context that Applicant set about the task of developing a ceramic body that would have improved properties that would resolve this drawback and result in reduced manufactured cost for the metal casting concerns. Applicant found that the failure rate of ceramic products of the type contemplated herein was partially reduced when the bodies could be processed so as to develop, initially, a uniform and controlled pattern of crack propagation. It is in this context that the first step of the present method was developed and has been favorably implemented.

The following definitions are presented as to several of the terms appearing herein that underly the invention. In particular, certain factors are set forth that define parameters that determine the practice of the invention, and these are set forth below.

Definitions of K Factors

A first K factor ($K^1$), is the Elastic Modulus, Young's Modulus or modulus of elasticity. This factor can be observed with respect to the present invention as the rate of change of unit tensile or compressive stress with respect to unit tensile or compressive strain for the condition of uniaxial stress within the proportional limit. The elastic behavior of materials under compression is the same as their behavior under tension within the range of the proportional limit, and the compressive stress-strain curve is merely an extension of the tensile stress-strain curve.

The Modulus of Elasticity is an index relating to the strength of a materials interatomic bonds. Although the maximum elastic strain in crystalline materials is usually very small, the stress necessary to produce this strain is usually great. This stress-strain ratio (Modulus of Elasticity) is high because the applied stress works in opposition to the restoring forces of primary bonds (ionic or covalent). As a result, the modulus of elasticity is the ability of a material to endure stress or strain within its chemical bonds.

Another term defining the stress under which ceramic bodies are placed is known as the Shear Modulus (or Rigidity), which may be defined by the tangential force per unit area divided by the angular deformation in radians. A further measure is Bulk Modulus, which may be defined as the ratio of the pressure on a body to its fractional decrease in volume.

A second K factor ($K^2$), Thermal Conductivity, is a measure of the ability of a substance to conduct heat. The time rate of steady heat flow through unit thickness of an infinite slab of homogeneous material in a direction perpendicular to the surface, induced by unit temperature difference.

For a block of material of cross section A, the energy transferred per unit time E/t, between faces a distance, l, apart is given by $E/t = \lambda A(T_2 - T_1)/l$, where $\lambda$ is the conductivity and $T_2$ and $T_1$ are the temperatures on the faces.

A related term and measure is Thermal Diffusivity. Thermal Diffusivity is the property given by the thermal conductivity divided by the product of the density and heat capacity per unit mass.

A third K factor, ($K^3$), is Heat Capacity or Thermal capacity. Thermal capacity may be defined as the ratio of heat supplied to an object or specimen to its consequent rise in temperature. A related term, Specific Heat, is defined by the ratio of the heat supplied to unit mass of substance to its consequent rise in temperature, and particularly, the amount of heat required to increase the temperature of 1 g of a substance 1 degree C.

A fourth K Factor ($K^4$), is Thermal Expansion, which may be defined as the fractional dimension change of the body per unit degree change of temperature. Thermal expansion may be compared to bonding energy, the coefficient of thermal expansion, and the elastic modulus (Young's modulus), through the following illustrative relationship: If the bonding energy is high, the coefficient of thermal expansion is small and the Young's modulus is high.

The force required to transform the untreated ceramic material is shape and size dependent as it relates to the four K factors (the thinner the cross section and smaller the linear dimension increases the specimens ability rapidly rise in temperature, since thermal conductivity is shape and size dependent ($K^2$).

It has thus been demonstrated by the above process that condensed matter can be transformed when the applied energy of activation produces stress-strain greater than the beginning material's original elastic limits $K^1$. These conditions change the atom structure and the chemical bonds in the subjected material, which has created a new state of substance, a new structure and new properties. This can be noted by the original material's dramatic increase in thermal shock resistance, since thermal shock resistance relates to a material's ability to absorb and dissipate energy.

Thus, the ceramic bodies prepared by the practice of Step (A) of the present invention exhibits such controlled macro- and micro-cracking and are already improved over those bodies that may be prepared in accordance with the prior art. The second and equally important aspect of the present method comprises the further treatment of the body having disposed therein controlled macro- and micro-cracking, to achieve the ultimate ceramic article of near theoretical density and high thermal shock resistance.

Accordingly and in a particular aspect, the method of the present invention seeks to transform the structure and properties of the ceramic material. The method is illustrated with a ceramic liner/cylinder such that containing alumina, at ambient temperature, that is placed into a furnace and preheated to about 982° C. Placing the ceramic into the furnace results in a temporary temperature drop. The furnace is allowed to recover and when the ceramic is fully saturated, the furnace is turned off. The ceramic slowly cools to ambient.

The treated ceramic is then installed in a press, and an initial pressure on the order of about 50,000 psi is tangentially applied. The ceramic is then subjected to a specific elevation of activation energy. The activation energy is required to change the physico-chemical interaction of polycrystalline material contained in the ceramic. This energy can be applied via a variety of processes, including but not limited to mechanical impact, sonication, modulated electromagnetic frequencies, and time vs. temperature vs. pressure cycling.

This process products as demonstrated in polycrystalline aluminum oxide a significant increase in thermal shock resistance (more than a delta T of 700° C.), also demonstrating a significant reduction in thermal expansion coefficient (T=30–400° C.) while maintaining the full density of the initial material. For example, the initial coefficient of thermal expansion measured $7.74 \times 10^{-6}$, compared to that of the end-point material which measured $4.69 \times 10^{-6}/°$ C.

This resulting new ceramic was also made with first up-quenching and without downquenching in the furnace, i.e. the ceramic is directly fitted into the press and the energy of activation is applied, as in the above process.

Since thermal shock resistance is characterized by a material's ability to rapidly absorb and dissipate energy without fatigue or fracture, it can then also be noted that similar events or failures occur in electronic devices when subjected to rapid increases in current caused by spike induced voltage surges etc. These surges can be caused by any number of events, such as, lightning strikes, faulty electric motors, etc.

The immediate improvement of this process is to allow a considerably shorter production time for manufacture of this material, in commercial quantities. Not only is the ceramic with new properties produced faster, but it can now be processed in a custom format. This means that material can be made specifically for specific applications.

The value added aspect of the present process will provide the manufacturer a process that increases the reliability and longevity of specific applications and components. Representative products that will benefit from the invention include inter alia, micro-chips for industrial, automotive and power generating stations, and the like, shot sleeves, plungers and mold inserts for the aluminum die casting industry, and cylinder liners, turbo-charger components for the automotive sector, as well as applications in the aerospace sector. For the electronics industry, specific applications include substrate materials, semi and superconductor materials and piezoelectric devices.

Further in accordance with the present invention, the ceramic body processed by the performance of Step (A) which in one embodiment, may include treatment to develop controlled micro cracking, is then exposed to a treatment involving the application of high temperature in conjunction with pressure or stress, to result in the modification of the crystal structure of the ceramic body and to pave the way thereby for the development of a body having the combination of improved properties represented herein.

Thus, the ceramic body such as that comprised of alumina, prepared in accordance with Step (A) is then subjected to a heat treatment ranging up to about 1200° C., and more particularly, from about 20° C. to about 1200° C., while the body is placed under stress or pressure ranging from about 10,000 psi to about 280,000 psi, and more preferably from about 60,000 psi to about 150,000 psi. The effect of the application of pressure in accordance with the present invention is schematically depicted in FIG. 1, wherein a model of the crystal structure of the ceramic is set forth. Thus, for example, the application of pressure, as schematically illustrated, alters the essentially hexagonal crystal structure to that of a quadragonal or diamond-shaped disposition of greater density. This effect, therefore, achieves the desired improvements in density that characterize ceramic products prepared in accordance with the present invention.

The practice of Step (B) of the present invention involves the application of both temperature and pressure. Recognizing the relationship of these parameters, it is to be understood that modulation of either parameter can be compensated for to some extent by the corresponding modulation of the other, so that, for example, increases in pressure would, as a consequence, raise temperature and thereby reduce the requirement for external application of temperature. Notwithstanding the foregoing, and as set forth in FIG. 2 herein, a preferred threshold pressure whereby optimal favorable properties are achieving in the resultingly processed ceramic, is 90,000 psi. This particular threshold is set forth herein inasmuch as it is considered in fulfillment of Applicants' duty to set forth a best mode presently known. Naturally, refinements in equipment and processing may vary the parameters explicitly stated herein somewhat, and the invention is accordingly intended to encompass and embrace such modifications within its spirit and scope.

Both steps of the present method may be performed by the imposition of thermal cycling, in other words, the performance of a plurality of such heating and cooling steps, to incrementally improve and thereby optimize the properties of the resulting ceramic article. The development of the combined properties of high density and resistance to thermal shock is supplemented with the conversion of the polycrystalline material to an anisotropic form. This last-mentioned property is believed to enhance the electrical capabilities of the resulting ceramic material and thereby facilitates the fabrication of specific electrical parts as listed earlier herein, from ceramic materials that have been optimally processed in accordance with the present invention.

As stated above, the ceramic material of the invention may be used in a variety of electrical and electronic applications. For electrical and electronic applications, ceramic materials must exhibit the following key characteristics: temperature, corrosion, environmental and dimensional stability; high mechanical strength; high thermal shock resistance; the promotion of adhesion to various materials; reduced dimensions, dielectric constants, loss factor and thermal expansion; increased thermal conductivity; and power distribution.

Increasing the environmental stability of ceramic materials is necessary to ensure the protection and proper function of integrated circuits, while increases in material strength are necessary to achieve dimensional stability. The differences in thermal expansion between the metal and ceramic components of the circuits can cause considerable stress in the substrates, and the thermal expansion of the ceramics will need to match that of the silicon to minimize the stresses created within the ceramic packaging.

The advantages of reduced dimensions are high packaging density, lower electrical resistance, higher transmission speeds or lower time delay and reduced weight. The advantages of reduced dielectric constant are higher transmission speeds in the signal in the dielectric environment, and reduced signal time delay. Reduction in loss factor yields a reduced dissipation of the signal energy, and reduced heating of the ceramic packaging, thereby avoiding the need for additional cooling. Increasing the thermal conductivity results in heat removal, and confers improvements in electrical resistance, transmission speed, and thermal stress. Lastly, increasing the power distribution through higher electrical conductivity of package metalization results in less energy dissipation and less heating of the ceramic packaging. All of the above characteristics are favorably modified by the use of ceramic materials in accordance with the invention.

Insulators may be prepared and find use primarily in the dielectric insulation of conductors and the like. Ceramic packaging of integrated circuits is another significant application. Individual integrated circuits are miniature electronic circuits produced within a single crystal of a semiconductor. They range from single logic circuits, little more than about 1 mm square, to large scale circuits measuring up to 8 mm square and containing on the order of a million or so transistors, or capacitors, and are widely used in microelectronics devices such as memory circuits, microcomputers, pocket calculators, electronic watches. Ceramic-metal packages are used for interconnections and environmental protection of diodes and transistors for power distribution, cooling and outputs.

A further area of application is the fabrication of capacitors. Capacitors are essential components of most electronic circuits. Not only can they store electrical energy, but these devices can be used for filtering out electronic noise for high frequency tuning.

Piezoelectric ceramics ($Pb(Mg_{1-3} Nb_{2-3})O_3$), are dielectric materials that are most commonly used in piezoelectric vibrators, pressure and acceleration sensors, ultrasonic motors, and piezoelectric actuators.

Electro-optical devices may be prepared from lead zirconate titanate or ferroelectric, and are characterized by a net spontaneous polarization which can be reversed or reoriented along a certain crystallographic direction of the crystal when the polar direction is changed, usually with an electric field. Applications of electro-optical ceramics include high speed shutters, switches, and light modulators and displays.

A wide range of ceramic sensors may also be prepared to measure such environmental parameters as gas, oxygen, temperature, voltage, and humidity. Typically, these are based on semiconducting oxides such as $TiO_2$, $ZrO$, $BaTiO_3$, $SnO_2$ and $MgCr_2O_3$.

Categories of ferrites (magnetic ceramics) include hard, soft, and microwave materials. All are based $Fe_2O_3$. The hard ferrites (MeO, $Fe_2O_3$ where Me—Sr, Ba) are used as permanent magnets and for motor applications. Soft ferrites (MeO, $Fe_2O_3$) are based on the cubic spinal structure (Me=Nt, Co, Cu, Zn, and Mn) are used in computer memory.

Ceramic superconductors have targeted a number of important applications such as energy storage, thin-film devices. (SQUIDS), microwave applications, and microelectronics. The structure of ceramic superconductors is based mainly on an oxygen-deficient, layered perovskite structure. Superconductor compounds have been found in the systems: Y—Ba—Cu—O, Bi(Pb)—Sr—Ca—Cu—O and Tl—Ca—Ba—Cu—B.

In general, the use of ceramic materials in the highly complex and multi-facial region of a microelectronics package requires close attention to processing details and control of precursor, synthesis, and impurity levels. Ceramic materials prepared by the present invention exhibit significantly improved properties such as thermal shock resistance, fracture resistance, toughness, ductility and electrical properties. Previous results indicate the reduction of relative permittivity, dielectric loss factor, and by increasing grain contact, may increase the conductivity of the new state of ceramic materials. This makes it possible to design ceramic materials that will perform far beyond their traditional limits, revolutionizing their applications in electrical and electronic applications.

As stated earlier, the enhancement of the properties together with the modification to lattice parameters, results in the unique combination of improved properties that characterize ceramic bodies prepared in accordance with the present invention. A recitation of the advantages of such material and their usage has been presented earlier herein, and it is clear that a broad cross-section of interdisciplinary applications is possible. The fracture toughness and density of the material renders it particularly well-suited for applications where, such as in cutting tools, such resistance to corrosion and abrasion is critical. Likewise, the ability to adjust and particularize the lattice structure of the resulting ceramic uniquely suits the material so prepared for the preparation of particular electrical articles where crystalline properties are crucial to the resulting properties of the product. Likewise, the ability of the ceramic prepared in accordance with the present invention to withstand severe and significant fluctuations in temperature yields a further and broad arena of industrial applications where materials having such temperature stability are needed, such as, for example, the use of the present ceramic materials in the preparation of cylindrical bodies for the casting of engine blocks for internal combustion engines.

Consequently, the invention further extends to ceramic articles having the aforenoted properties that are prepared by the method of the present invention as outlined herein.

Referring now to Table 1, the specific combination of properties that are evident from the practice of the present invention are illustrated. Specifically, the present invention was investigated and developed as a result of efforts to improve upon shot sleeve liners for use in the apparatus and method set forth in U.S. Pat. No. 5,322,111, commonly assigned herein. To this extent, the following describes a representative testing procedure wherein the present method was developed and refined.

EXAMPLE 1

Materials and Methods:

A sample press was prepared, which was adapted to contain a plurality of cylindrical ceramic samples. The press was assembled and initially preheated to a temperature of between 300 and 550° C., after which it was removed from the furnace and ceramic samples were inserted. The press was then permitted to cool to an ambient of about 20° C., at which point the press was fitted with cooling lines for the circulation therethrough of a cooling medium in accordance with the present method and test. Likewise, the press in question was fitted with a heating element that facilitated the increase of the temperature to the limitations indicated earlier, after which such temperature was raised, for example, at a rate of about 100° C. per second. During thermal cycling, which then took place, pressure on the order of 60,000 to about 280,000 psi were imposed, as indicated, in a tangential manner, so that the effect of the present method and particularly Step (B) thereof could be ascertained. Subsequent to thermal cycling, the body was then cooled, the individual materials cooled to an ambient of about 20° C., after which the ceramic samples were removed, inspected and further tested. The results of testing of such properties and a comparison of their benefits is set forth in Table 1, below.

TABLE 1

Comparison of Properties/Ceramic Materials

| Material Properties | u/m | Alumina 98.8% Material-O | Alumina 98.8% Material-II | Difference/ Material-II |
|---|---|---|---|---|
| Thermal Shock Resistance* | ~C° | <300 | >650 | +>350 |
| Crystal System | | hex-R | hex-R | n/a |
| Space Group | | R3c | R3c | n/a |
| Material O | | | | |
| Lattice Parameter, a(b) | Å(Angstrom) | 4.7587(2) | | |
| Lattice Parameter, c | Å | 12.992(1) | | |
| Volume of Unit Cell of Crystal Structure, V | Å | 254.79(3) | | |
| Material II | | | | |
| Tangential (Y) direction | | | | |
| Lattice Parameter, $a_t(b_t)$ | Å | | 4.7578(3) | −0.0009 |
| Lattice Parameter, $c_t$ | Å | | 12.985(3) | −0.007 |
| Volume of unit cell of Crystal Structure, $V_t$ | Å$^3$ | | 245.55(5) | −0.24 |
| Radial (Z) direction | | | | |
| Lattice Parameter, $a_r(b_r)$ | Å | | 4.7583(2) | +0.0004 |
| Lattice Parameter, $c_r$ | Å | | 12.990(1) | +0.002 |
| Volume of Unit Cell of Crystal Structure, $V_r$ | Å$^3$ | | 254.70(3) | +0.09 |
| Longitudinal (X) Direction | | | | |
| Lattice Parameter, $a_l(b_l)$ | Å | | 4.7593(2) | +0.0006 |
| Lattice Parameter, $c_l$ | Å | | 12.994(1) | +0.002 |
| Volume of Unit Cell of Crystal Structure, $V_l$ | Å$^3$ | | 254.89(2) | +0.10 |
| Density | g/cm$^3$ | 3.85 | 3.85 | 0 |
| Apparent Porosity | 0/0 | <1 | <1 | 0 |
| Elastic Modulus | GPa | 363 | 363 | 0 |
| Shear Modulus | GPa | 148 | 148 | 0 |
| Bulk Modulus | GPa | 222 | 223 | +1 |
| Hardness | GPa | 13.6 | 13.9 | +0.3 |
| Fracture Toughness | MPa√m | ~4.0 | ~5.6 | +~1.6 |
| Poisson's Ratio | | 0.227 | 0.228 | +0.001 |

Material-O = beginning material
Material-II = developed material
*Data based upon thermal shock by quenching.
The crystallographic data indicate that the body of the polycrystal Material-O is isotropic, and the body of the polycrystal Material-II is anisotropic.

In reviewing Table 1, the material identified as Material O represents that material which has not been exposed to the thermal cycling and method of the present invention. It is clear from a review of the table that the thermal shock resistance of this material is significantly lower than that of Material II representing the material process in accordance with the present invention.

Figure 2:
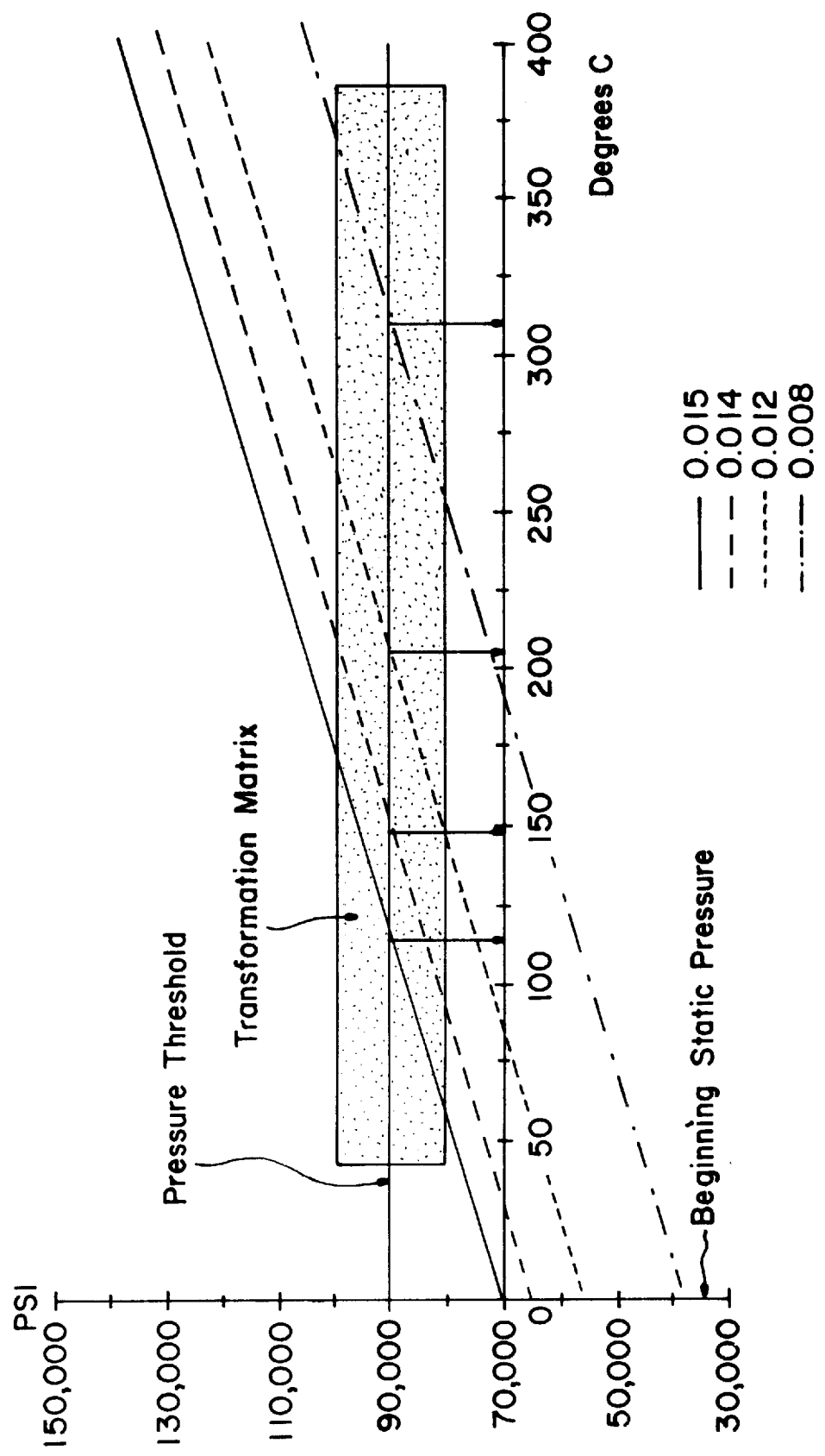
FIG. 2 is a graph presenting the results of the practice of the method of the present invention.

As indicated earlier, and with reference to FIG. 2 herein, the specific parameters of the practice of the present method, may be modified to achieve different effects in the resulting ceramic article. The combination of parameters is graphically set forth in FIG. 2, where ceramic bodies of the type used in the apparatus denoted in U.S. Pat. No. 5,322,111 were prepared and thereafter installed. Specifically, such installations involve the inclusion of the body within the metal sleeve, followed by the shrink fitting of the sleeve in an attempt to assure consistent fit as between the two. As can be appreciated, the heating and consequent cooling of the metal sleeve with its greater coefficient of thermal expansion results in the imposition of extreme pressures on the ceramic body whose coefficient is not as great. Only those bodies processed in accordance with the present invention and most optimally treated were able to undergo what is referred to as transformation, to endure the substantial fluctuation in temperature as the body is cooled from the heated state of the outer metal sleeve, without the propagation of detrimental cracks within the body. The results set forth graphically in FIG. 2 amply illustrate the fact that the favorable combination of parameters reflected by the practice of the present invention facilitated the preparation of a body having the improved properties of density as well as thermal shock resistance.

It has been noted that:
  the crack density generally increases as the crack size decreases, this can be controlled by quenching-temperature differences;
  the retained strength of the materials at severe thermal shock is proportional to the density of cracks;
  the kinetic energy of the crack is transformed into surface energy;
  with increasing the crack density the critical temperature difference of ~c increases;
  to achieve the same thermal stress if other quenching materials are used with less coefficient of heat transfer, it is required to increase the ΔT;
  in general, the crack density is a function of the type of material, thermal shock resistance, specimen size, and shape.

Applied static load/pressure, coupled by inducing thermal-compression stress cycling to the ceramic body or sample (~10–280 Kpsi and temperatures up to 1200° C.) as performed in Step (B) may reduce distances between the atoms (ions). These slightly squeeze the crystal structures and increase the bonds between particles. As a result, the strength of the material becomes higher, and fracture toughness increases (Table 1). Material "II" is able to withstand thermal shock higher than 650° C. temperature differences induced by molten aluminum.

Resistance to fracture initiation and resistance to crack propagation are improved significantly. As confirmed by leading researchers, and for example, as mentioned in Hasselman et al. (1985) *J. Am. Ceram. Soc.* 533:9, 490–495; Hasselman et al. (1988), "Thermal Stress Resistance of Engineering Ceramics," pp. 193–217 in *Advanced Ceramics II*, ed. S. Soiniya. Elsevier Applied Science, Barking, Essex, UK, it is considered to be significant to have a ceramic material with both high thermal shock resistance and fracture resistance.

During crack healing under high compression, there is a continuous regression of the crack at the crack tip or a discontinuous pinching of crack along the length of the crack. The crack width also decreases simultaneously, as the result of so many bonds between the surfaces of micro-cracks. In turn, this has reduced the stress concentration and increased the fracture toughness of the sample.

The development of such a micro-crack zone generally increases the fracture resistance of the material. This micro-crack zone consists of very fine and highly dense micro-cracks. The micro-cracks were formed primarily by two processes:

1. partly healing cracks, which already exist in the material (created by quenching);
2. inducing very fine micro-cracks by thermal-compressive stresses.

The micro-cracking is predicated on the existence of residual stress due to thermal expansion anisotropy [Davidge et al. (1968) *J. Mater. Sci.* 3:629]. Such anisotropy is typical of non-cubic materials. Thermal expansion anisotropy results in residual stresses with a wavelength in the order of the grain facet length, which oscillate between tension and compression along adjoining facets. The micro-cracks formed are relatively short (~10–50 $\mu$m) and narrow (~0.001–0.1 $\mu$m) as a result of the existence of high compression stresses (10–280 kpsi). The basis for this premise is the appreciation that the micro-cracks arrest in the regions of residual compression. We could probably consider that the concept of the crack closure as in Elber (1970) *Eng. Frac. Mech.* 2:37–45 was proposed to arise from the elastic constraint of material surrounding the plastic zone enclave in the wake of the crack tip, on material elements previously plastically stretched at the tip. Closure then results from interference between crack surfaces due to the misfit strain. Such shielding was induced by cyclic stresses.

Residual stresses, both around flaws and within grains, emerge as an influence on the brittle failure process.

The created micro-crack process zone can result in crack shielding and consequently, a material with an enhanced fracture toughness [Evans et al. (1984) *J. Am. Ceram. Soc.* 67:255–260]. Micro-crack toughening is invariably characterized by a resistance "R" curve [Evans, supra; Swain (1988), "R-Curve Behavior in Ceramic Materials, pp. 45–67, in *Advanced Ceramics II*, ed. S. Siyomiya, Elsevier Applied Science; Evans et al. (1984) "Mechanical Behavior of Alumina: A Model Anisotropic Brittle Solid, in *Advances in Ceramics*, V. 10, *Structure and Properties of MgO and Al$_2$O$_3$ Ceramics*, ed. W. D. Kinsery. The American Ceramic Society, Inc., Columbus, Ohio; Evans (1990), *J. Am. Ceram. Soc.* 73(2)187–206; Marshall et al. (1987) *Reliability of Advanced Structural Ceramics and Ceramic Matrix Composites—A Review, Ceramic Bulletin*, V. 66(2): 309–317]. The increase of fracture toughness, $K_R$, with crack length is called "R"-curve behavior. The toughening is predicated on both the elastic modulus dissemination in the micro-crack process zone and the dilation induced by micro-cracking. It is assumed that the kinetic energy of the crack is transformed into surface energy. The formation of a zone of micro-cracks around the crack tip can be considered as analogous to the crack-tip plastic zone in metals, which dissipates energy through work done via the opening and sliding displacements involved in micro-cracking and through creation of surfaces [Hoagland et al. (1980) *J. Am. Ceram. Soc.* 65(5):242–245]. Notably, a frontal process zone provides a substantially smaller effect on toughness than a fully extended zone over the crack surface. The source of the toughness is the residual energy density in the wake. The residual energy density is derived primarily from the dilatation that accompanies micro-cracking, with a small additional toughening effect due to the lower elastic modulus of the process zone [Evans (1978), supra].

The influence of the wake is manifested in R-curve behavior, wherein the fracture resistance, $K_R$, increases continuously with crack advance. There are strict requirements on micro-structural dimensions and uniformity to achieve significant increases in toughness by micro-cracking. The incorporation of a high density of micro-cracks can significantly improve the fracture resistance (or thermal shock resistance) of brittle materials. Interaction of cracks will also decrease the stress intensity and will also raise the fracture resistance.

Grain size effects the fracture resistance. Specifically, the critical stress decreases as the grain size increases, causing the slope of the R-curve to exhibit a corresponding increase [Evans (1984), supra; Swain, supra; Evans et al. (1984), supra].

The basis for the analysis of single phase is similar to that developed for transformation toughening [McMeeking et al. (1982) *J. Am. Ceram. Soc.* 65(5):242–245; Badiansky et al. (1992) *Int. J. Solids Structures* 19:337]. However, for the single phase, it is much easier to improve the micro-crack process zone by the present method than for the multi-phase transformation zone.

So many other mechanisms can contribute to improvements in fracture toughness for single phase are: crack branching, crack deflection, crack bridging (by grains), and residual stresses which also expose resistance curve behavior in the toughening. Consequently, more than one mechanism plays a role in toughening processes, and interactions between mechanisms must be considered, which can be synergistic [Evans (1990), supra; Marshall (1987), supra; Hoagland et al. (1980), supra; McMeeking et al. (1982), supra; Badiansky et al. (1992), supra; Clarke (1992) *J. Am. Ceram. Soc.* 75(4):739–759].

Thus, it is very promising to combine two or more mechanisms to improve the thermal shock resistance/fracture resistance of brittle materials. As an example, combining a micro-cracking matrix with ductile reinforcements, which can be beneficial for designing a new material.

The present process for the improvement of the thermal shock resistance/fracture resistance in ceramic materials as illustrated by alumina, undoubtedly hold implications for use in other non-cubic polycrystals, such as $Si_3N_4$, ($\alpha$-Sic, and $BaTiO_3$ [Evans et al. (1984), supra], etc. The mechanisms of brittle fracture are the same, therefore mechanisms of the improvement of the thermal shock resistance/fracture resistance should be the same, with the specific trends in strength and toughness between materials being contingent upon ~α~T, the cleavage resistance and the dominant processing flaws. In fact, present evidence already indicates that similar strength and toughness trends pertain in $Si_3N_4$ [Rice (1977) *Treatise Mater. Sci. Technol.* 11:199; Heuer et al. (1980) *J. Am. Ceram. Soc.* 63:53], including the effects on toughness of micro-cracking and grain size.

EXAMPLE 2

Materials Testing using Molten Aluminum as the Temperature Medium (melting temperature of molten aluminum is 660° C.)

Testing parameters used to determine thermal shock resistance,

Category 1 preheat Material-0 to 230° and pour molten aluminum to the surface and let temperature soak into ceramics
Observation: separation of material "failed"

Category 2 preheat Material-0 to 230° C. and pour molten aluminum to the surface while installed under radial compression, and let temperature soak into ceramics
Observation: separation of material "failed"

Category 3 preheat Material-0 to 360° C. and pour molten aluminum to the surface and let temperature soak into ceramics
Observation: separation of material "failed"

Category 4 pour molten aluminum to the surface Material-0 from ambient 20° C. and let temperature soak into ceramics
Observation: separation of material "failed"

Category 5 pour molten aluminum to the surface of Material-II from ambient 20° C. while installed under compression, and let temperature soak into ceramics
water at ambient temperatures was sprayed onto this heated surface to rapidly cool the material
Observation: no separation of material "passed"

Category 6 pour molten aluminum to the surface of Material-II from ambient 20° C. and let temperature soak into ceramics
water at ambient temperatures was sprayed onto this heated surface to rapidly cool the material
material was submersed into a water bath (ambient)
Observation: no separation of material "passed"

Category 7 pour molten aluminum to the surface of a variety of cerami $AL_2O_3/ZrO_2$ & $AL_2O_3$ composite materials from ambient 20° C. and let temperature soak into ceramics
water at ambient temperatures was sprayed onto this heated surface to rapidly cool the material
material was submersed into a water bath (ambient)
Observation: separation of material "failed"

As stated earlier, one of the advantages that characterizes the present method is that the changes in structure and properties of ceramic materials so treated, occur in combination with each other, and are dependent on the starting material's chemical composition, density, and elastic modulus, etc. Accordingly, an important feature of the present method is the ability to tailor a bulk ceramic material's properties to suit or enhance a particular end use, with specific focus on, (a) thermal shock resistance, (b) increasing or decreasing the thermal expansion, (c) modifying electrical properties, (d) simple process to stabilize bulk ceramic materials.

More particularly, the method of the present invention is able to transform solid/bulk ceramic materials to a new state. This is accomplished via the interconnection of composition and structure by modulating an applied energy against and through the bulk ceramic materials elastic limits, heat capacity, thermal conductivity and thermal expansion, with the resulting ability to create a new combination of properties, which expands the use of the original solid/bulk ceramic materials in environments far beyond their traditional limits. The solid/bulk ceramic materials is transformed when the applied energy of activation produces strain greater than the starting material's original elastic limits, while in turn preventing the solid/bulk ceramic material from destruction or separating itself by retaining it in a body, or vessel, allowing the interconnection and structure to reposition itself.

An illustrative ceramic material comprising 98.8 wt. % $Al_2O_3$ was analyzed by synchrotron radiation using X-ray absorption fine structure. This test indicated that the chemical bonds have been modified as a result of the present process.

EXAMPLES 3–7

Several ceramic compositions were prepared and treated by the present invention, in accordance with procedures set forth herein, and measurements of the relevant properties of these materials were taken. The results are set forth in Tables 2–5, below. The data confirm and demonstrate that properties of ceramic materials can be modified using the present method, and that a new combination of properties can be attained, that can be tailored by modifying certain of the parameters of the process. Thus, Tables 2 and 4 demonstrate the improvements that were achieved with alumina ceramics of 98.8 and 96 wt. %, respectively, and Table 5 presents data establishing similar improvements and benefits with the processing of AlN (aluminum nitride) and $Si_3N_4$ (silicon nitride), respectively.

Referring particularly to Tables 2 and 4, the essential parameter that reflects the improved properties of the ceramic materials of the invention, is expressed in the values for thermal shock resistance, that are uniformly improved. Other of the parameters such as shear modulus, that may appear anomalous, are capable of conformance by modifications to the procedures and conditions of the process that are wholly within the skill of the art, and such modifications are considered to be included within the scope of the present invention.

TABLE 2

Characteristics of the ASPRO Technology Materials

| Material Properties | Unit | Error % | 0TS | 2TS | Dif.* % | UPQ2TS | Dif.* % | 02TS | Dif.* % |
|---|---|---|---|---|---|---|---|---|---|
| Composition | $Al_2O_3$ wt. % | 0.1 | 98.8 | 98.8 | 0 | 98.8 | 0 | 98.8 | 0 |
| Crystal System | | | Hex-R | Hex-R | | Hex-R | | Hex-R | |
| Space Group | | | R3C | R3C | | R3C | | R3C | |
| Density | $g/cm^3$ | 0.1 | 3.828 | 3.837 | +0.23 | 3.839 | +0.29 | 3.840 | +0.31 |
| Apparent Porosity | % | | <1 | <1 | | <1 | | <1 | |
| Thermal Shock Resistance, Tc | °C. | 15 | <300 | >650 | >117 | >650 | >117 | >650 | >117 |
| Coefficient of Thermal Expansion | $\times 10^{-6}$/°C. | | | | | | | | |
| 25–400° C. | | 5 | 7.74 | 7.55 | −2.4 | 4.75 | −38.6 | 6.72 | −13.2 |
| 25–800° C. | | 5 | 8.39 | 7.93 | −5.4 | 6.83 | −18.6 | 7.80 | −7.0 |
| 25–1000° C. | | 5 | 9.31 | 6.62 | −28.9 | 7.79 | −16.3 | 8.29 | −11.0 |
| Specific Heat | J/g° C. | | | | | | | | |
| 25° C. | | 1 | 0.732 | N/A | | 0.853 | +16.5 | 0.742 | +1.4 |
| 400° C. | | 1 | 1.161 | N/A | | 1.446 | +24.5 | 1.260 | +8.5 |
| Thermal Diffusivity | $cm^2$/s | | | | | | | | |
| 25° C. | | 2.7 | 0.08403 | N/A | | 0.08242 | −1.9 | 0.09027 | +7.4 |
| 400° C. | | 1 | 0.02733 | N/A | | 0.02582 | −1.9 | 0.02747 | +0.5 |
| Thermal Conductivity | W/m° C. | | | | | | | | |
| 25° C. | | 4 | 23.5460 | N/A | | 26.9898 | +14.6 | 25.7205 | +9.2 |
| 400° C. | | 2.5 | 12.1463 | N/A | | 14.8883 | +22.6 | 13.2911 | +9.4 |
| Young's Modulus | GPa | 0.1 | 359.1 | 359.9 | +1.22 | 358.5 | −0.17 | 359.8 | +0.19 |
| Longitudinal Modulus | GPa | 0.1 | 412.3 | 417.8 | +1.33 | 404.3 | −1.94 | 418.9 | +1.60 |
| Shear Modulus | GPa | 0.1 | 146.8 | 146.2 | −0.41 | 148.0 | +0.82 | 145.9 | −0.61 |
| Bulk Modulus | GPa | 0.1 | 216.6 | 222.9 | +2.91 | 207.0 | −4.43 | 224.4 | +3.60 |
| Poisson's Ratio | | 0.1 | 0.223 | 0.231 | +3.59 | 0.211 | −5.38 | 0.233 | +4.48 |
| Hardness | GPa | 10 | 17.1 | N/A | | 16.2 | −5.3 | 17.2 | +0.6 |
| Flexural Strength | MPa | 10 | 189 | N/A | | 220 | +16.4 | | |
| Fracture Toughness | MPa√m | 10 | 5.4 | N/A | | 5.0 | −7.4 | | |
| Dielectric Constant | | | | | | | | | |
| 1 kHz | | 1 | 11 | | | 11 | 0 | 9.69 | −11.9 |
| 5 kHz | | 1 | 11 | | | 11 | 0 | 9.68 | −12.0 |
| 10 kHz | | 1 | 11 | | | 10.9 | −0.9 | 9.68 | −12.0 |
| 100 kHz | | 1 | 10.9 | | | 10.9 | 0 | 9.66 | −11.2 |
| 1 MHz | | 1 | 10.8 | | | 10.9 | +0.9 | 9.64 | −10.7 |
| 10 MHz | | 1 | 10.7 | | | 10.7 | 0 | 9.57 | −10.6 |
| 13 MHz | | 1 | 10.7 | | | 10.7 | 0 | 9.54 | −10.8 |
| Dielectric Loss | % | | | | | | | | |
| 1 kHz | | 1 | <0.05 | | | <0.05 | 0 | <0.05 | 0 |
| 5 kHz | | 1 | <0.05 | | | <0.05 | 0 | <0.05 | 0 |
| 10 kHz | | 1 | 0.47 | | | 0.40 | −14.9 | 0.04 | −91.5 |
| 100 kHz | | 1 | 0.24 | | | 0.29 | +20.8 | 0.03 | −87.5 |
| 1 MHz | | 1 | 0.15 | | | 0.21 | +40.0 | 0.07 | −53.3 |
| 10 MHz | | 1 | 0.29 | | | 0.66 | +127.6 | 0.19 | −34.5 |
| 13 MHz | | 1 | 0.40 | | | 0.93 | +132.5 | 0.27 | −32.5 |

*Net Change in properties for Transformed Material vs. Original Material (0TS)
0TS-is original material without treatment
2TS-is transformed material, it have been previously up- and down-quenched at 1st stage of transformation;
UPQ2TS-is transformed material. it have been just previously up-quenched at 1st stage of transformation;
02TS-is transformed material, it have not been previously up- and/or down-quenched at 1st stage of transformation;

TABLE 3

Anisotropic Properties of the ASPRO Technology Materials

| Materials Properties Coefficient of Thermal Expansion | Unit $\times 10^{-6}$/°C. | Error % | UPQ2TS Longitudinal, X Direction | Tangential, Y Direction | Radial, Z Direction |
|---|---|---|---|---|---|
| 25–400° C. | | 5 | 4.75 | 5.45 | 4.83 |
| 25–800° C. | | 5 | 6.83 | 7.44 | 6.73 |
| 25–1000° C. | | 5 | 7.79 | 8.21 | 7.79 |

TABLE 4

Characteristics of The ASPRO Technology Materials

| Material Properties | Unit | Error % | OCE | UPQ2CE | Dif % |
|---|---|---|---|---|---|
| Composition | $Al_2O_3$ wt % | 0.1 | 96 | 96 | 0 |
| Crystal System | | | Hex-R | Hex-R | |
| Space Group | | | R3C | R3C | |
| Density | g/cm³ | 0.1 | 3.696 | 3.710 | 0.38 |
| Apparent Porosity | % | | <1 | <1 | |
| Thermal Shock Resistance, Tc | °C. | 15 | <300 | >650 | +117 |
| Coefficient of Thermal Expansion | ×10⁻⁶/°C. | | | | |
| 25–400° C. | | 5 | 7.48 | 8.66 | +15.8 |
| 25–800° C. | | 5 | 8.34 | 8.96 | +7.4 |
| 25–1000° C. | | 5 | 8.78 | 9.19 | +4.7 |
| Specific Heat | J/g°C. | | | | |
| 25° C. | | 1 | 0.777 | 0.820 | +5.5 |
| 400° C. | | 1 | 1.261 | 1.351 | +7.1 |
| Thermal Diffusivity | cm²/s | | | | |
| 25° C. | | 2.2 | 0.04551 | 0.07273 | +59.8 |
| 400° C. | | 2.8 | 0.02364 | 0.02566 | +8.5 |
| Thermal Conductivity | W/m°C. | | | | |
| 25° C. | | 4 | 13.1 | 22.1 | +69 |
| 400° C. | | 4 | 11.0 | 12.9 | +17 |
| Young's Modulus | GPa | 0.1 | 314.6 | 316.5 | +0.60 |
| Longitudinal Modulus | GPa | 0.1 | 363.0 | 364.6 | +0.44 |
| Shear Modulus | GPa | 0.1 | 128.2 | 129.1 | +0.70 |
| Bulk Modulus | GPa | 0.1 | 192.1 | 192.5 | 0.21 |
| Poisson's Ratio | | 0.1 | 0.227 | 0.226 | −0.44 |
| Harness | GPa | 10 | 11.4 | 10.7 | .6 |
| Flexural Strength | MPa | 10 | | | |
| Fracture Toughness | MPa√m | 10 | 3.9 | 4.2 | +8 |
| Dielectric Constant | | | | | |
| 1 kHz | | 1 | 10.03 | 10.24 | +2.1 |
| 5 kHz | | 1 | 9.91 | 9.92 | +0.1 |
| 10 kHz | | 1 | 9.87 | 9.84 | −0.3 |
| 100 kHz | | 1 | 9.80 | 9.74 | −0.6 |
| 1 MHz | | 1 | 9.76 | 9.68 | −0.8 |
| 10 MHz | | 1 | 9.68 | 9.61 | −0.7 |
| 13 MHz | | 1 | 9.65 | 9.58 | −0.7 |
| Dielectric Loss | % | | | | |
| 1 kHz | | 1 | <0.05 | <0.05 | 0 |
| 5 kHz | | 1 | 0.89 | 2.51 | +182.0 |
| 10 kHz | | 1 | 0.65 | 1.76 | +170.8 |
| 100 kHz | | 1 | 0.33 | 0.59 | +78.8 |
| 1 MHz | | 1 | 0.23 | 0.22 | −4.3 |
| 10 MHz | | 1 | 0.44 | 0.57 | +29.5 |
| 13 MHz | | 1 | 0.34 | 0.47 | +38.2 |

Dif. (Differences) is the net charge in properties for Transformed Material vs., Original Material;
OCE-is original alumina without treatment;
UPQ2CE-is transformed alumina, it has been just previously up-quenched at 1st stage of transformation;

TABLE 5

Characteristics of the ASPRO Technology Materials

| Material Properties | Unit | Error % | OAIN | UPQ2AIN | Dif. % | OSI₃N₄ | UPQ2SI₃N₄ | Dif. % |
|---|---|---|---|---|---|---|---|---|
| Composition | wt. % | 0.1 | 97% Aln | 97% Aln | 0 | 98% β-Si₃N₄ | 98% β-Si₃N₄ | 0 |
| Crystal System | | | Hexagonal | Hexagonal | | Hexagonal | Hexagonal | |
| Space Group | | | P63mc | P63mc | | P63/m | P63/m | |
| Density | g/cm³ | 0.1 | 3.340 | 3.322 | −0.54 | 3.218 | 3.225 | +0.22 |
| Apparent Porosity | % | | | | | | | |
| Thermal Shock Resistance, Tc | °C. | 15 | | | | | | |
| Coefficient of Thermal Expansion | ×10⁻⁶/°C. | | | | | | | |
| 25–400° C. | | 5 | 5.76 | 6.21 | +7.8 | | | |
| 25–800° C. | | 5 | 6.02 | 6.26 | +4.0 | | | |
| 25–1000° C. | | 5 | 6.16 | 6.27 | +1.8 | | | |
| Specific Heat | J/g°C. | | | | | | | |

TABLE 5-continued

Characteristics of the ASPRO Technology Materials

| Material Properties | Unit | Error % | OAlN | UPQ2AlN | Dif. % | OSI$_3$N$_4$ | UPQ2SI$_3$N$_4$ | Dif. % |
|---|---|---|---|---|---|---|---|---|
| 25° C. | | 1 | 0.800 | 0.695 | −13.1 | 0.635 | 0.644 | +1.4 |
| 400° C. | | 1 | 1.277 | 1.150 | −9.9 | 1.110 | 1.181 | +6.4 |
| Thermal Diffusivity | cm$^2$/s | | | | | | | |
| 25° C. | | 2.2 | 0.35843 | 0.37430 | +4.43 | | | |
| 400° C. | | 2.8 | 0.15424 | 0.16369 | +6.13 | | | |
| Thermal Conductivity | W/m° C. | | | | | | | |
| 25° C. | | 4 | 95.3 | 86.9 | −8.8 | | | |
| 400° C. | | 4 | 65.4 | 62.9 | −3.8 | | | |
| Young's Modulus | GPa | 0.1 | 330.0 | 328.8 | −0.36 | 310.8 | 311.1 | +0.35 |
| Longitudinal Modulus | GPa | 0.1 | 386.6 | 384.0 | −0.68 | 393.2 | 394.3 | +0.28 |
| Shear Modulus | GPa | 0.1 | 133.4 | 133.1 | −0.23 | 121.8 | 121.9 | +0/08 |
| Bulk Modulus | GPa | 0.1 | 208.7 | 206.5 | −1.07 | 230.8 | 231.8 | +0.43 |
| Poisson's Ratio | | 0.1 | 0.237 | 0.235 | −0.85 | 0.276 | 0.276 | 0 |
| Hardness | GPa | 10 | | | | | | |
| Flexural Strength | MPa | 10 | | | | | | |
| Fracture Toughness | MPa√m | 10 | | | | | | |
| Dielectric Constant | | | | | | | | |
| 1 kHz | | 1 | 9.49 | 10.00 | +5.4 | | | |
| 5 kHz | | 1 | 9.44 | 9.64 | +2.1 | | | |
| 10 kHz | | 1 | 9.42 | 9.47 | +0.5 | | | |
| 100 kHz | | 1 | 9.37 | 9.21 | −1.7 | | | |
| 1 MHz | | 1 | 9.33 | 9.10 | −2.5 | | | |
| 10 MHz | | 1 | 9.26 | 9.01 | −2.7 | | | |
| 13 MHz | | 1 | 9.22 | 8.98 | −2.6 | | | |
| Dielectric Loss | % | | | | | | | |
| 1 kHz | | 1 | <0.05 | <0.05 | 0 | | | |
| 5 kHz | | 1 | <0.05 | <0.05 | 0 | | | |
| 10 kHz | | 1 | <0.05 | <0.05 | 0 | | | |
| 100 kHz | | 1 | 0.21 | 1.19 | +467 | | | |
| 1 MHz | | 1 | 0.10 | 0.39 | +290 | | | |
| 10 MHz | | 1 | 0.01 | 0.08 | +700 | | | |
| 13 MHz | | 1 | 0.07 | 0.05 | −28.6 | | | |

Dif. (Differences)-is the net change in properties for Transformed Materials vs. Original Materials
OAlN-is original AlN without treatment
UPQ2AlN-is transformed AlN, it has been previously up-quenched at 1st stage of transformation;
OSI$_3$N$_4$-is original Si$_3$N$_4$, without treatment
UPQ2Si$_3$N$_4$-is transformed Si$_3$N$_4$, it has not been previously up-quenced at 1st Stage of transformation;

Discussion:

Neutron diffraction and X-ray diffraction analyses presented later on herein, establish that the present method produces a definite change in the crystallographic texture of the solid bulk materials such as 98.8 wt. % Al$_2$O$_3$ (Alumina) and 97 wt. % AlN (Aluminum Nitride). There is an associated influence on the performance of the materials, because there is anisotropy of the subjected materials single crystal physical properties, such as is demonstrated by the thermal expansion coefficients set forth in Table 3, above.

Important evidence of the effectiveness of the present process is the demonstrated improvement in thermal shock resistance of the Al$_2$O$_3$ presented in Tables 2 and 4. Further, the changes in thermal expansion coefficient observed after "transformation" are important, reliable evidence of some type of change in the structure of the material. The test is straightforward, reproducible, and the changes correlate with the improved thermal shock resistance. The negligible changes in modulus, hardness, strength, and fracture toughness indicate that the improvement in thermal shock resistance has not come at the cost of degrading the mechanical performance of the material as is usually the case. The apparent changes in specific heat and dielectric loss factor are intriguing. Changes in these properties may provide insight into the fundamental structural changes involved in the "transformation" and suggest potential for electrical, electronic, and/or optical properties of "transformed" material to be modified.

EXAMPLE 7

In this series of experiments, alumina specimens were subjected to neutron beam analysis. The sampling volume was approximately a cube of (2 mm)$^3$, which increased the signal by a factor of 8 and allowed the exploration of many more diffraction peaks as well as both Y and Z directions in each specimen. Diffraction peaks were acquired for 6 (hkl) values. The raw data, neutron counts versus scattering angle were fitted with a gaussian peak on a linear background. The fitting parameters likely to be of interest are shown in Table 6, below. Columns are Integrated Intensity of the gaussian (and its associated fitting uncertainty), the Mean Scattering Angle (and its fitting uncertainty), the Width (Degrees) of the diffraction peak (and its fitting uncertainty) and the Constant part of the background (with its fitting uncertainty). The uncertainties are important in making evaluations of the significance of any differences that are detected between specimen OTS and specimen UPQ2TS.

Figure 3:
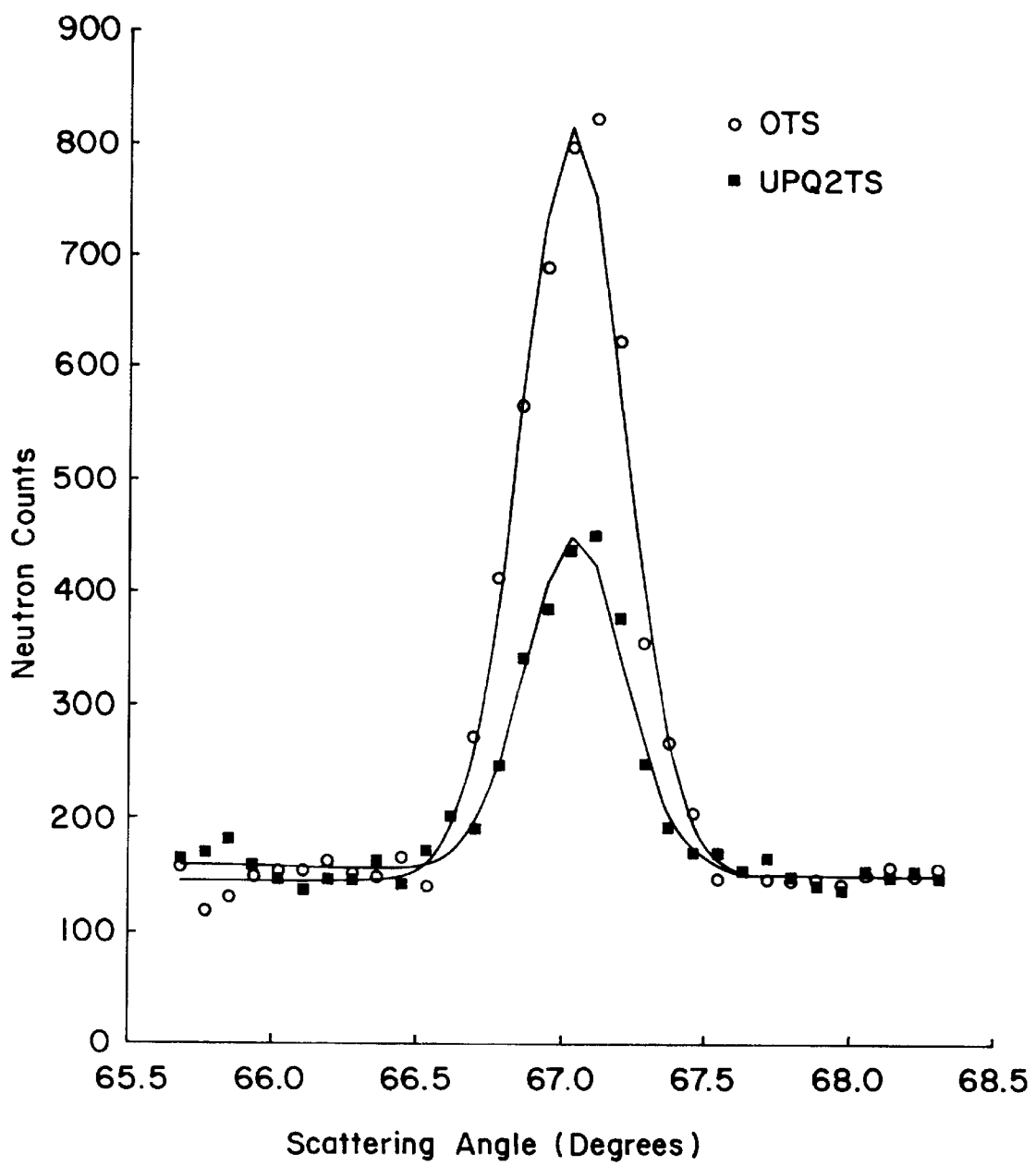
FIG. 3 is a graph of the results of neutron diffraction measurements in the "Y" direction, of ceramic materials prepared in accordance with the invention.
Figure 4:
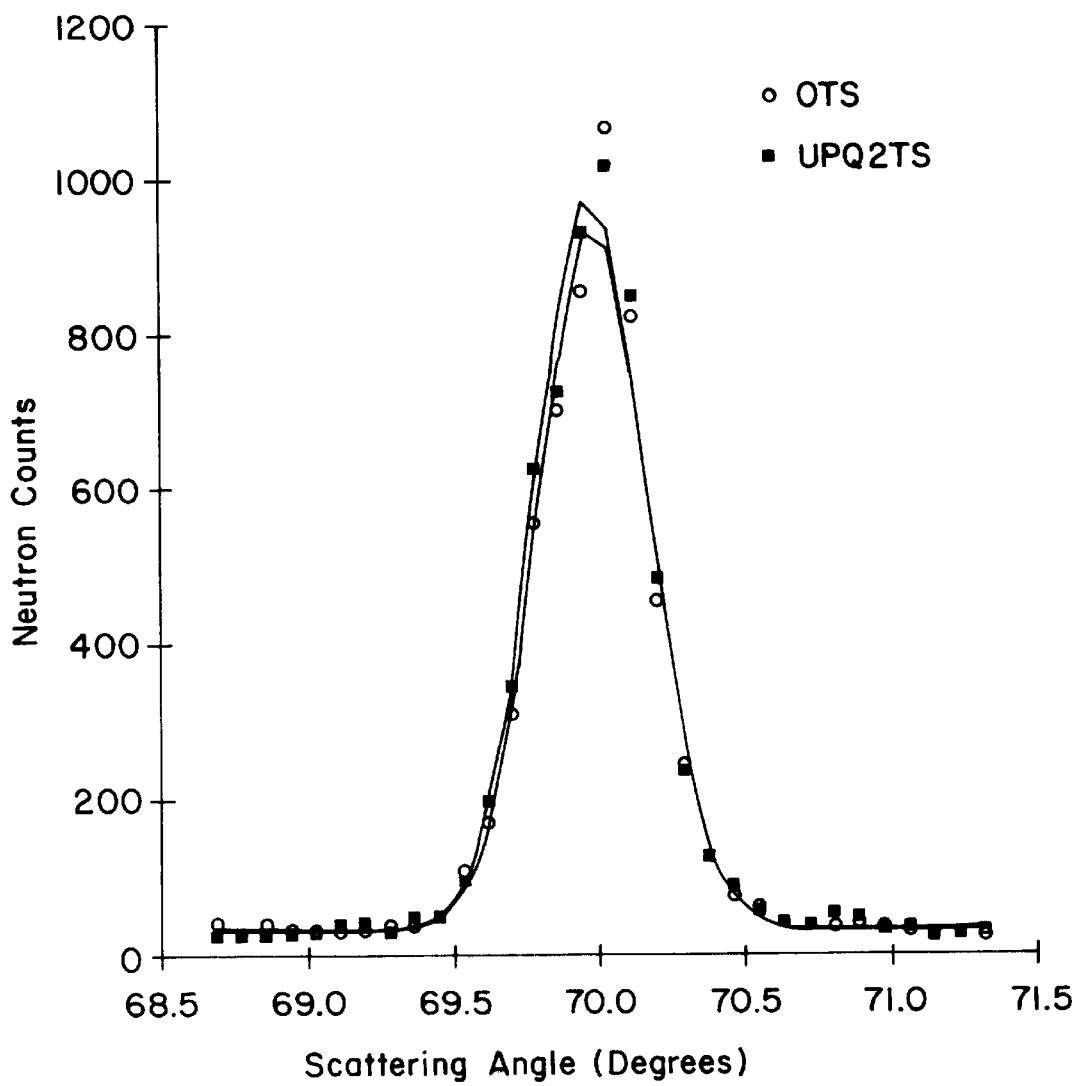
FIG. 4 is a graph of the results of neutron diffraction measurements in the "X" direction, of ceramic materials prepared in accordance with the invention.

Raw diffraction peaks were plotted with their fitted gaussian functions in FIGS. 3 and 4, enclosed. It is clear that differences between specimens are quite pronounced in the (006) diffraction peak, but negligible in the (2–13) diffraction peak.

The data have been reduced to make comparisons slightly easier, and the results are shown in Table 7. The integrated intensity and the mean scattering angle were chosen as the parameters of focus. The percentage decrease of intensity going from OTS to UPQ2TS is statistically significant only in the (104), (006) and (2–16) peaks. This decrease is larger in the Y direction than in the Z direction. The shift in mean scattering angle, 2θ, is quoted as a lattice strain, $\epsilon$ where $$\epsilon = (\sin(\theta OTS)/\sin(\theta UPQ2TS) - 1)$$

Lattice strains might have been expected if there were chemical differences between the materials, or if there were residual stresses in the specimens. However, there does not seem to be much lattice strain present.

From the above it was determined that the indicator to track with location in the examination of material prepared in accordance with the invention is the integrated intensity. The variability of this signal is greatest in the (006) diffraction peak. The data also suggest that the present process influences the crystallographic texture of the material.

TABLE 6

AHCS Feasibility Test
April, 1996
Diffraction peaks measured on the E3 Neutron Diffractometer, NRU Reactor, Chalk River Laboratories
Standard Stree-scanning setup.
Peaks measured at dead center of 2 cube-shaped specimens. Sampling volume (2 mm)$^3$
Various (hid) peaks were measured to see if one or another would provide a better "signal"
Diffraction peak data were fitted by a gaussian on a slopin, linear bacground, as is customary
The relevant peak parameters are listed below:

| RUN # | hcp Lattice (hkl) | Integrated Intensity | (Uncert) | Mean Angle | (Uncert) | Width FWHM | (Uncert) | Backgd Level | (Uncert) |
|---|---|---|---|---|---|---|---|---|---|
| Specimen 0TS Direction "Y" | | | | | | | | | |
| 3  | (10–2) | 19.7  | 0.8 | −40.184 | 0.004 | 0.27 | 0.01 | 3.1 | 0.1 |
| 4  | (10–4) | 9.9   | 0.4 | −55.903 | 0.006 | 0.35 | 0.01 | 3.9 | 0.1 |
| 5  | (006)  | 20.3  | 0.6 | −67.045 | 0.005 | 0.43 | 0.01 | 4.5 | 0.2 |
| 6  | (2–13) | 143.3 | 4.7 | −69.992 | 0.005 | 0.44 | 0.01 | 5.2 | 0.6 |
| 7  | (20–4) | 17.7  | 0.7 | −66.664 | 0.010 | 0.58 | 0.02 | 6.3 | 0.3 |
| 8  | (2–16) | 64.1  | 2.0 | −96.640 | 0.007 | 0.72 | 0.02 | 9.4 | 0.7 |
| Direction "Z" | | | | | | | | | |
| 15 | (10–2) | 13.4  | 0.5 | −40.183 | 0.004 | 0.28 | 0.01 | 2.7 | 0.1 |
| 16 | (104)  | 8.4   | 0.4 | −55.903 | 0.007 | 0.36 | 0.02 | 3.6 | 0.1 |
| 17 | (006)  | 21.8  | 0.7 | −67.043 | 0.005 | 0.42 | 0.01 | 4.3 | 0.2 |
| 18 | (2–13) | 131.7 | 4.1 | −69.966 | 0.005 | 0.45 | 0.01 | 4.8 | 0.6 |
| 19 | (20–4) | 17.6  | 0.7 | −86.858 | 0.010 | 0.60 | 0.02 | 6.6 | 0.3 |
| 20 | (2–16) | 86.0  | 2.2 | −96.647 | 0.008 | 0.74 | 0.02 | 8.1 | 0.7 |
| Specimen UPQ2TS Direction "Y" | | | | | | | | | |
| 9  | (10–2) | 19.2  | 0.9 | −40.178 | 0.005 | 0.28 | 0.01 | 3.3 | 0.2 |
| 10 | (104)  | 6.0   | 0.3 | −55.906 | 0.006 | 0.33 | 0.01 | 3.8 | 0.1 |
| 11 | (006)  | 8.7   | 0.4 | −67.054 | 0.008 | 0.41 | 0.02 | 4.4 | 0.1 |
| 12 | (2–13) | 150.2 | 4.5 | −69.985 | 0.005 | 0.45 | 0.01 | 5.9 | 0.6 |
| 13 | (20–4) | 16.5  | 0.7 | −86.856 | 0.011 | 0.58 | 0.03 | 6.2 | 0.3 |
| 14 | (2–16) | 51.1  | 1.7 | −96.653 | 0.010 | 0.73 | 0.02 | 9.3 | 0.7 |
| Direction "Z" | | | | | | | | | |
| 21 | (10–2) | 14.2  | 0.6 | −40.178 | 0.004 | 0.28 | 0.01 | 2.6 | 0.1 |
| 22 | (104)  | 7.5   | 0.3 | −55.904 | 0.005 | 0.37 | 0.01 | 3.7 | 0.1 |
| 23 | (006)  | 15.4  | 0.7 | −67.044 | 0.007 | 0.40 | 0.02 | 4.0 | 0.2 |
| 24 | (2–13) | 134.0 | 3.6 | −69.984 | 0.004 | 0.45 | 0.01 | 4.7 | 0.5 |
| 25 | (20–4) | 18.4  | 0.7 | −66.868 | 0.010 | 0.61 | 0.02 | 6.0 | 0.3 |

TABLE 7

| Effects observed in UPQ2TS wrt OTS | Percent Decrease in Intensity | Uncert. | Lattice Strain ($10^{-1}$) | Uncert. |
|---|---|---|---|---|
| Direction "Y" | | | | |
| (10–2) | 2   | 4 | 1.4  | 1.0 |
| (10–4) | 49  | 5 | −0.3 | 1.1 |
| (006)  | 80  | 4 | −1.2 | 0.7 |
| (2–13) | −5  | 3 | 0.9  | 0.7 |

TABLE 7-continued

| Effects observed in UPQ2TS wrt OTS | Percent Decrease in Intensity | Uncert. | Lattice Strain ($10^{-1}$) | Uncert. |
|---|---|---|---|---|
| (20–4) | 7 | 4 | 0.8 | 0.9 |
| (2–16) | 49 | 3 | –1.0 | 0.5 |
| Direction "Z" | | | | |
| (10–2) | –6 | 4 | 1.2 | 1.0 |
| (104) | 12 | 5 | –0.2 | 1.1 |
| (006) | 34 | 4 | –0.1 | 0.7 |
| (2–13) | –2 | 3 | 0.3 | 0.8 |
| (20–4) | –3 | 4 | –1.0 | 0.9 |
| (2–16) | 6 | 3 | 0.6 | 0.6 |

Neutron diffraction texture analyses on three specimens prepared in accordance with the invention, were performed as set forth below.

$F_2 = [\Sigma_{72} \chi I(\chi,\eta)\sin\chi\cos^2\chi]/[\Sigma_{\gamma\chi}\sin\chi]$. which increases as the basal poles are concentrated towards the Z direction of the cube.

$FY = [\Sigma_{72} \chi I(\chi,\eta)\sin^3\chi\sin^2\chi]/[\Sigma_{\gamma\chi}\sin\chi]$. which increases as the basal poles are concentrated towards the Y direction of the cube.

$FY = [\Sigma_{72} \chi I(\chi,\eta)\sin^3\chi\cos^2\chi]/[\Sigma_{\gamma\chi}\sin\chi]$. which increases as the basal poles are concentrated towards the X direction of the cube.

Data Collection and Presentation

Figure 5:
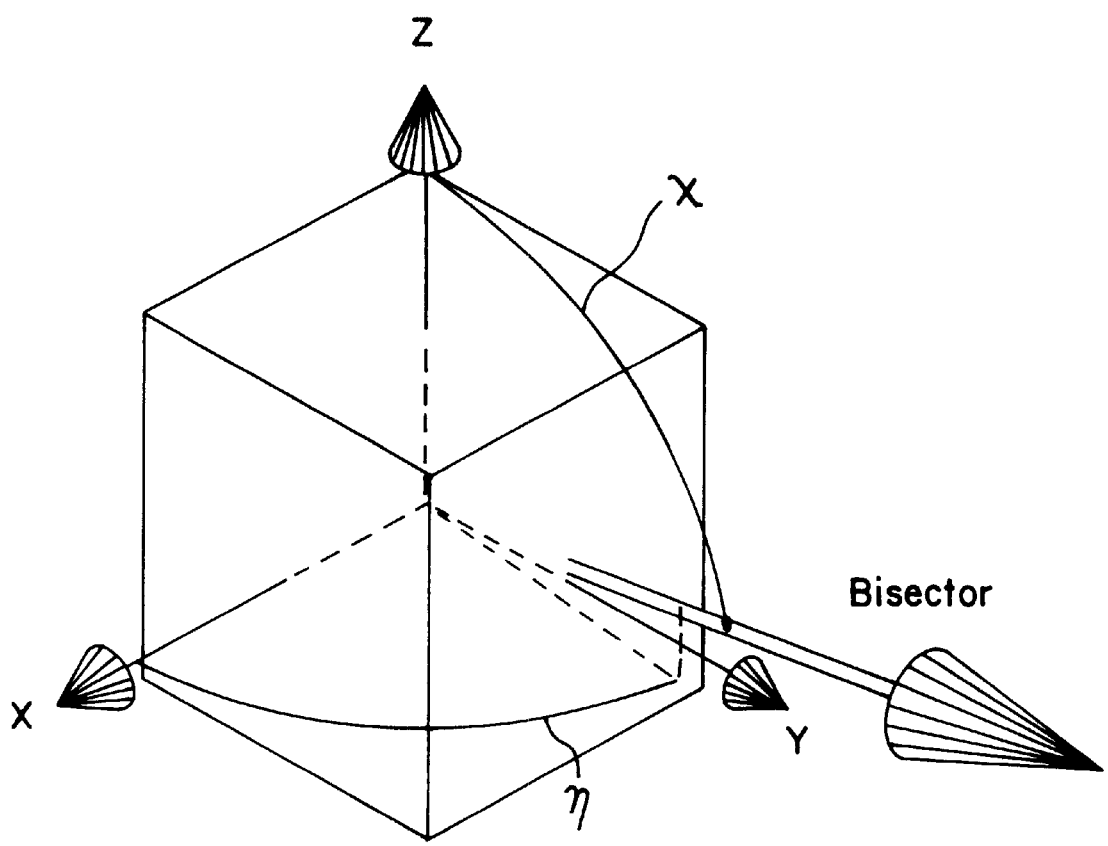
FIG. 5 is a graph depicting three-dimensionally, the directional angles in the coordinate system of the cube-shaped specimens subjected to neutron diffraction.

The intensity of the (0006) neutron diffraction peak is directly proportional to the volume fraction of crystallites within your cube-shaped specimens, whose (0006) plane-normals are parallel to the bisector of the incident and diffracted neutron beams. An Eulerian cradle systematically orients the cube-shaped specimen to sweep this bisector through a complete hemisphere of directions in the specimen. Direction is specified by two angles, χ-tilt from the Z-direction of the specimen and η=azimuthal angle from the X-direction of the specimen (See FIG. 5). At each specimen orientation the intensity of the (0006) diffraction peak is measured.

The neutron beam penetrates through the entire volume of the cube, so the measurement is an average over the specimen volume. The normalized intensity versus direction (χ,η) is plotted on a stereographic "pole figure". In this Figure, the specimen Z direction is at the center of the plot, and the perimeter of the plot is in the specimen XY plane. Contour lines join directions of equal intensity. The heavy solid line indicates the intensity that would be obtained if the crystallographic texture was completely random. The thinner continuous lines indicate intensities greater than random and the dashed lines indicate intensities less than random. Decorated contours are the minima (o) and maxima (χ). The contour interval is 0.2× the intensity that would be obtained in a random distribution of crystallite orientations.

The Raw Results

Figure 6:
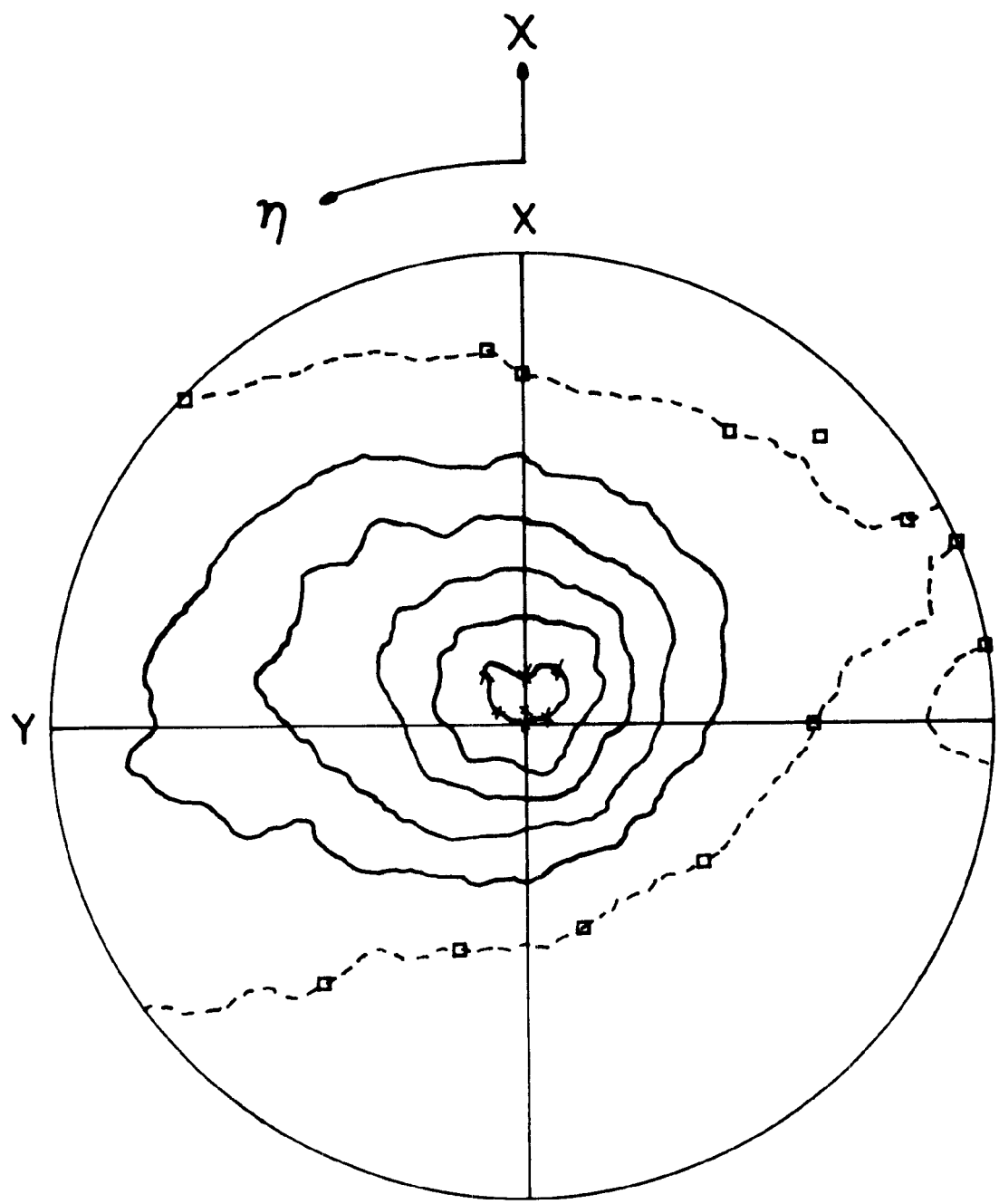
FIG. 6 is the diffraction-peak intensity pole figure for the reference specimen OTS.
Figure 7:
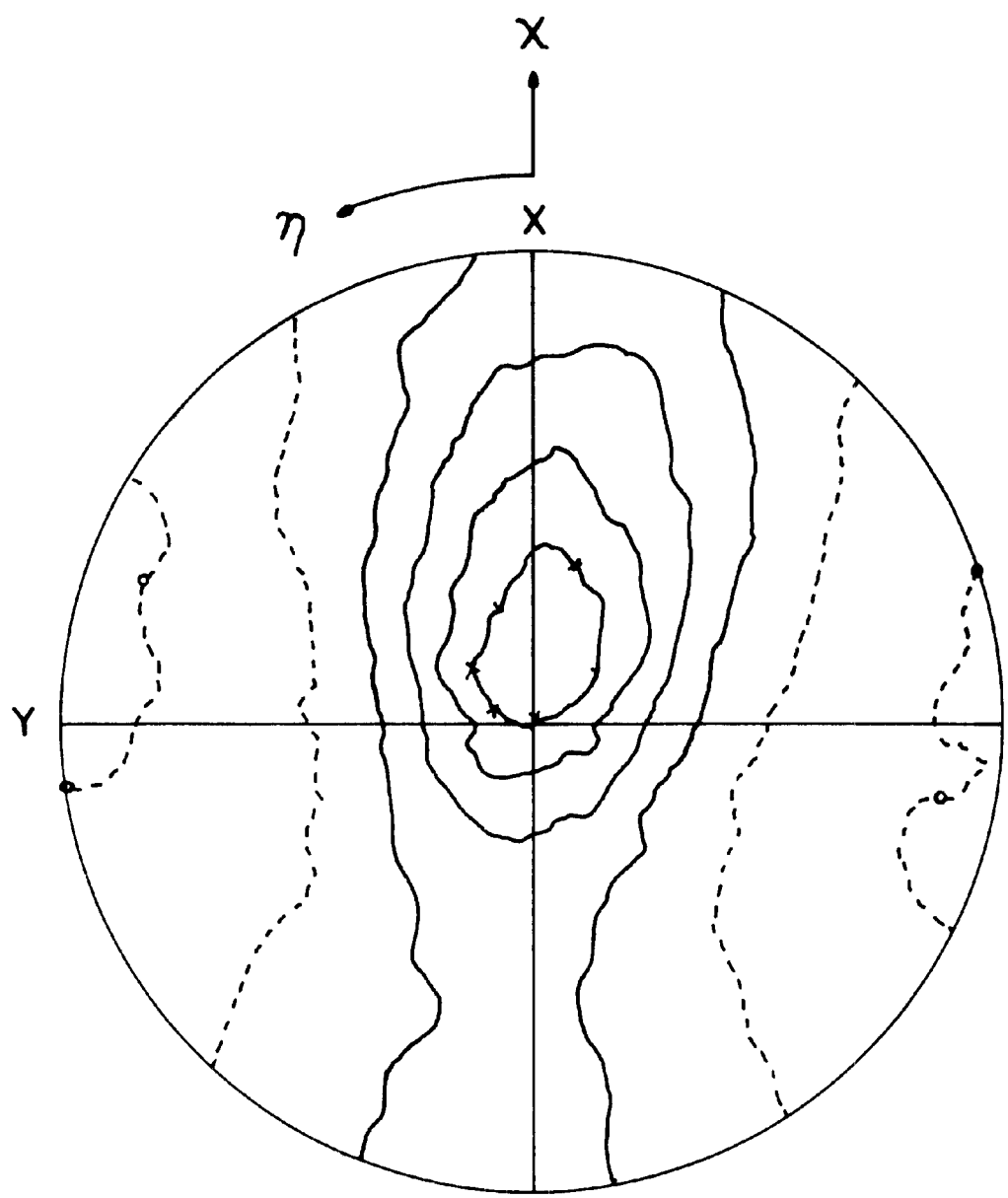
FIG. 7 is the diffraction-peak intensity pole figure for the treated specimen URQ2TS.
Figure 8:
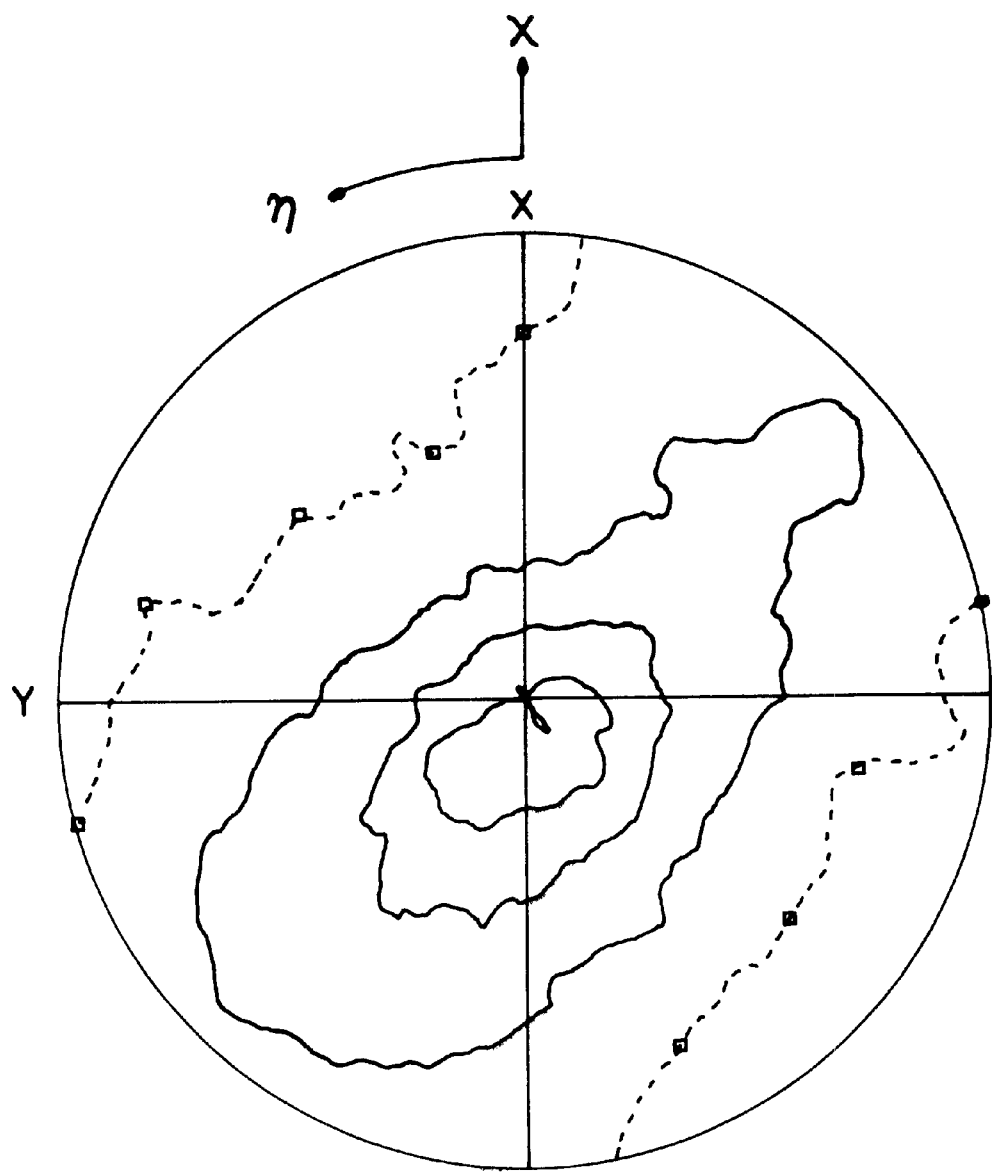
FIG. 8 is the diffraction-peak intensity pole figure for the treated specimen O2TS.

The variation of intensity of the (0006) diffraction peak versus direction in the three specimens, is shown in FIGS. 6–8. In all three of the specimens, the degree to which crystallites have preferred orientations is not large. Also in all three cases, the symmetry axes of the texture do not coincide with the XYZ axes of the cube-shaped specimens. However, it is clear from the pole figures that there are qualitative differences in the textures of the treated specimens (URQ2TS and O2TS) compared to a reference specimen (OTS). The reference specimen exhibits an intensity distribution that is nearly cylindrically symmetry about an axis that nearly coincides with the specimen Z direction. Both of the treated specimens have distributions with an elongated shape, which is most marked in the URQ2TS material. This result demonstrates that the present process has produced a definite change in the crystallographic texture of the alumina material. There may be an associated influence in the performance of the material, because there are anisotropies in the physical properties of alumina single crystals, such as the thermal expansion coefficient.

Calculation of Quantitative Indicators

The shape of the (0001) basal pole figures in materials whose crystal structures exhibit hexagonal prism symmetry are sometimes quantified through simple parameters, Fα, defined by J. J. Kearns (Westinghouse Co. Report WAPD-TM-472, Pittsburgh, Pa., 1965). These parameters characterize the fraction of basal poles, resolved into a particular direction of the specimen. The intensity of the (0006) diffraction peak in a given direction is denoted I (χ,η). For the cube-shaped specimens, the following are defined The values of the F-parameters, calculated from the (0006) pole figures from each of the three specimens are presented in Table 8. The specimen URQ2TS is outstanding in that the value of Fγ is minimal and the value of Fχ is maximal. These values are quantitative measures of the fact that the URQ2TS pole figure exhibits the highest intensity in the X direction and the lowest intensity in the Y direction. In the series OTS, URQ2TS and O2TS, there is also an increasing spread of (0006) plane-normals away from the Z direction, which is indicated by a systematic reduction of the value of $F_2$.

TABLE 8

Resolved fractions of basal poles in principal specimen directions

| Specimen | $F_z$ | $F_y$ | $F_x$ |
|---|---|---|---|
| OTS | 0.41 | 0.31 | 0.29 |
| URQ2TS | 0.40 | 0.26 | 0.34 |
| O2TS | 0.38 | 0.31 | 0.31 |

Conclusions

The following is a summary of the findings on the effects of the present process on the degree of preferred orientations of crystallites (ie. crystallographic texture) in alumina.

Normal processing of alumina (e.g. sintering, or hot isostatic pressing) is not expected to alter the preferred orientations of the crystallites that comprise the bulk of the material. We performed neutron diffraction measurements of the crystallographic texture in the specimens of alumina that were examined. The measurements revealed a significant difference in the crystallographic textures of the materials that were identified as "treated"(in accordance with the invention) and "untreated". It is remarkable that the preferred orientations of crystallites in alumina can be altered by a process that occurs at temperatures less than 900° C.

The present results are sufficient to demonstrate that the present process has altered the physical condition of the alumina material.

EXAMPLE 8

In this experiment, samples of materials prepared in accordance with the invention were subjected to X-ray absorption analysis. The procedures followed and the results obtained are presented below.

Introduction

XAFS (X-ray absorption fine structures) is now a highly developed technique and is widely used for materials characterization. It refers to the modulation of the x-ray absorption coefficient above a particular core level of interest (Al K-edge for example). Conventionally, XAFS is divided into two regions, the near-edge region, which includes the first 40–50 eV above the threshold, and is sometimes referred to as XANES (X-ray Absorption Near Edge Structure) and the EXAFS (Extended X-ray Absorption Fine Structures), the region beyond the XANES to as much as 1000 eV above the threshold. Intense resonances are often observed in the XANES region; these features are characteristic of the electronic structure (densities of states) as well as the molecular structure of the local and extended environment (several neighbouring atom shells). This is the area where we may have the best chance of observing the difference in the Al oxide samples. The EXAFS region exhibits oscillations resulting from the interference of the outgoing and backscattering photoelectron waves at the absorbing atom, hence EXAFS is sensitive to the interatomic distance between the absorbing atom and its nearest neighbouring atoms, the coordination number and the dynamic behaviour (Debye-Waller factor which contains information about the relative mean displacement in bond length as the result of thermal disorder). The results are graphically depicted, and all spectra are sums of many scans.

2. XANES results (FIGS. 9–13)

Figure 9:
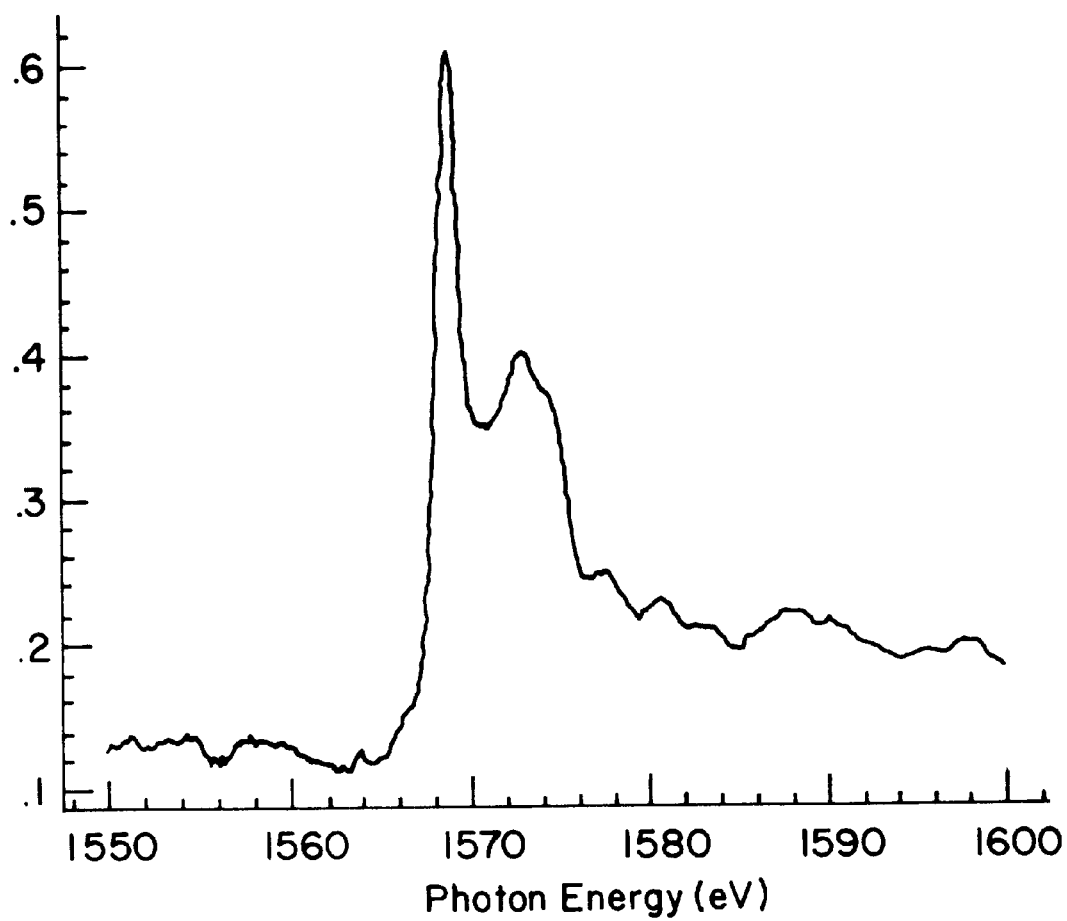
FIGS. 9–13 are graphs presenting the results and comparisons of the performance of X-ray absorption analyses of samples of materials prepared in accordance with the present invention.
Figure 10:
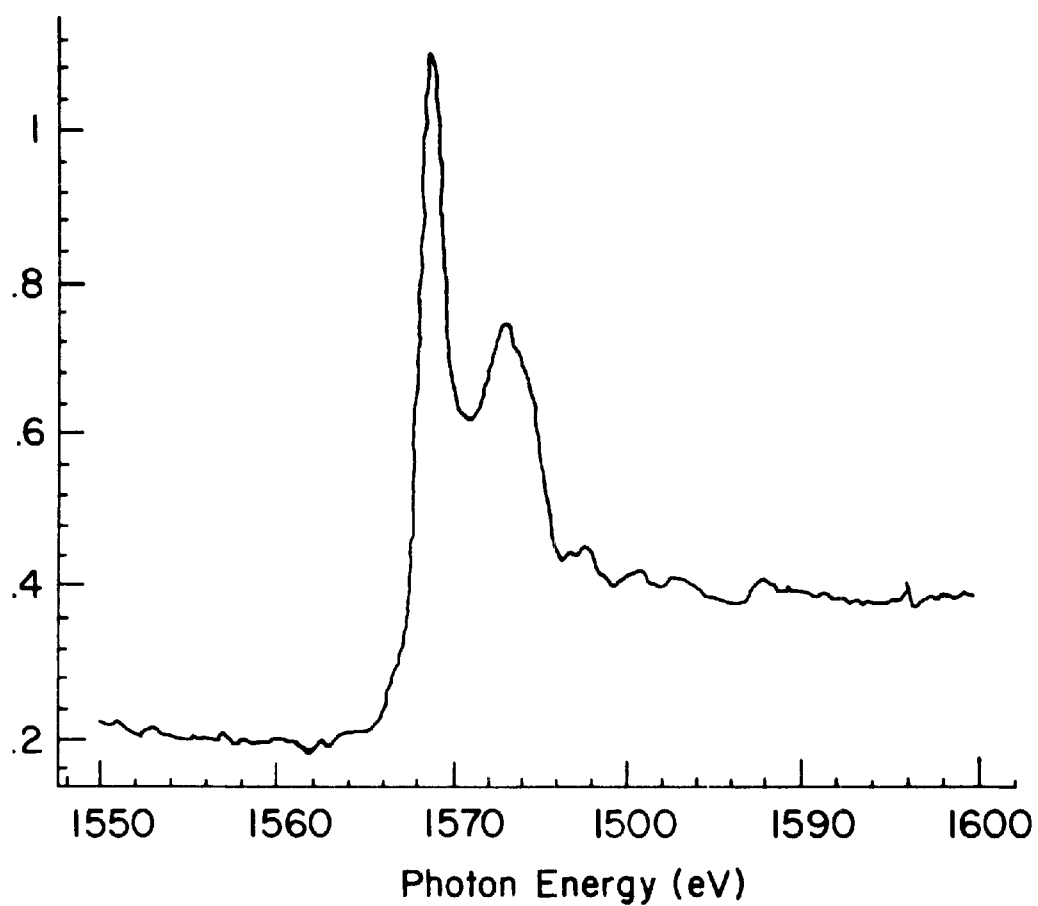

FIGS. 9 and 10 are the Si K-edge XANES (raw data) for samples UPQ and OTS respectively. Both spectra look the same as those of $Al_2O_3$ (corundum) at first glance. Close inspection reveals that there is a small difference in the region between 1584–1594 eV where the UPQ sample exhibits higher intensity.

Figure 11:
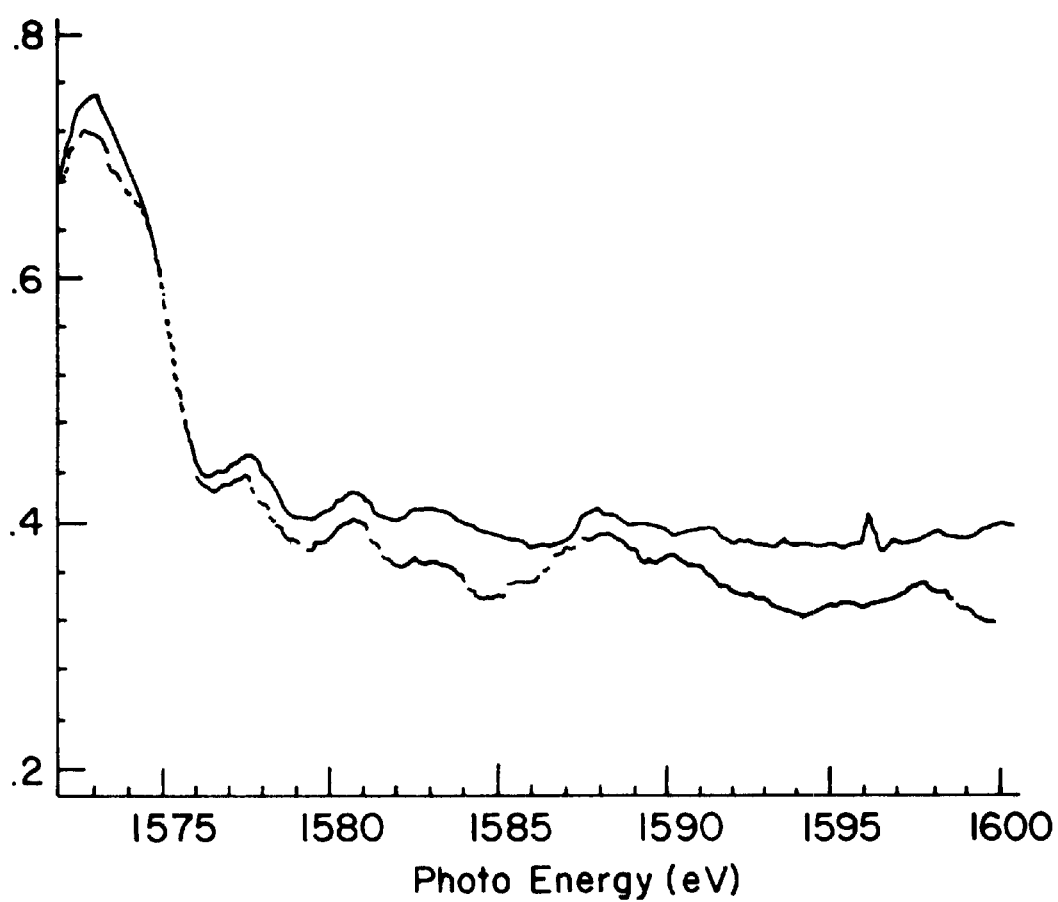
Figure 12:
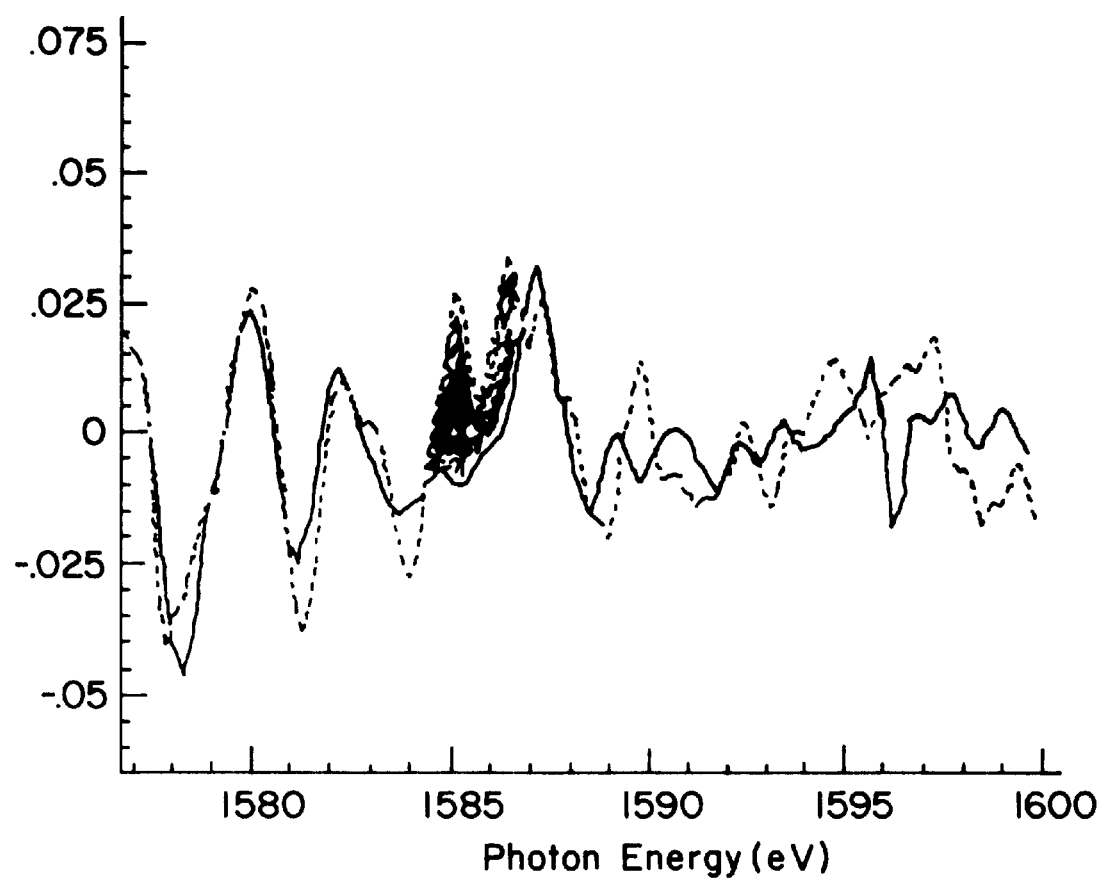
Figure 13:
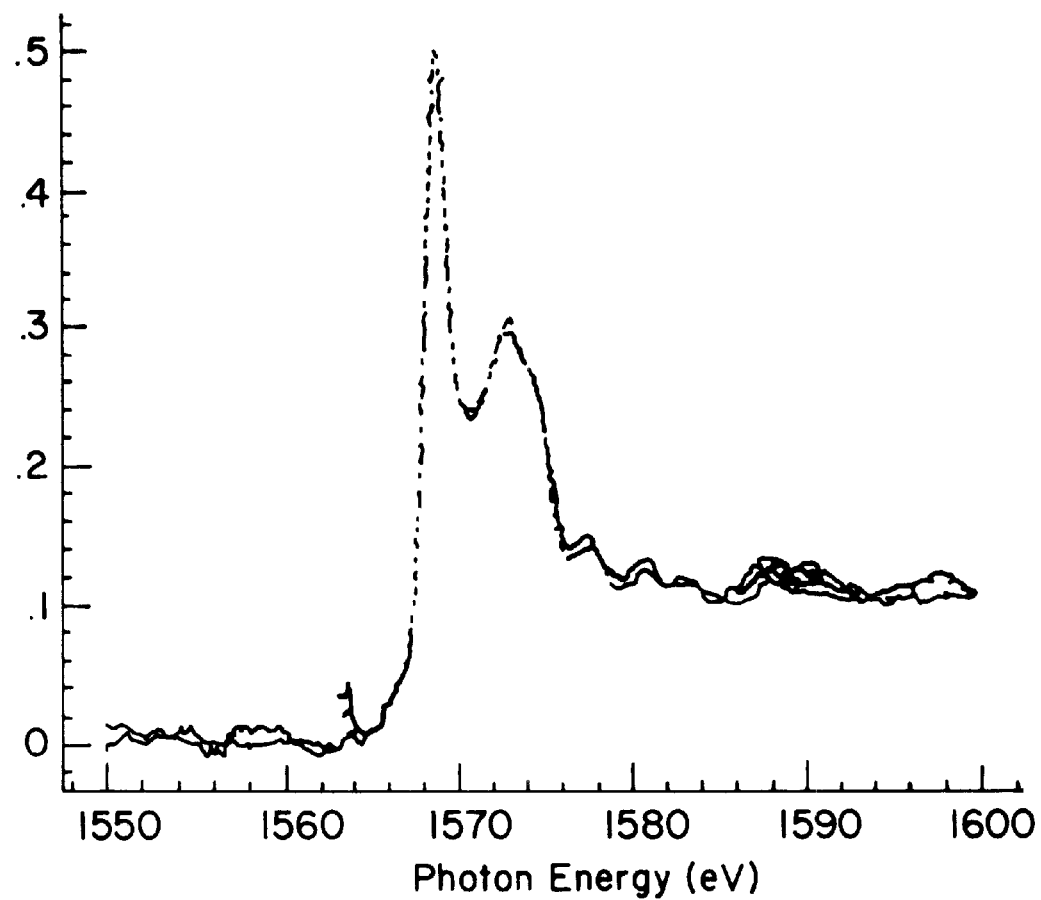

The difference can be seen more clearly in FIG. 11 where the scale has been expended. It also shows up in the first derivative of the absorption spectra (FIG. 12) where the shaded area shows the statistically acceptable difference. The origin of the difference in the absorption coefficient in this region is not very clear at present. It may be due to difference arising from slightly different backgrounds. This however is not likely to be the case. In FIG. 13 a linear background was subtracted from the UPQ spectrum so that the slope of the background is nearly the same for both the OTS and UPQ spectra. The result of this procedure is shown in FIG. 13 where it can be seen that the difference remains. This additional intensity, if it is real, is probably given rise by a tighter Al—O bond in the lattice or additional densities of states if one views from a band structure perspective. The conventional wisdom is that absorption in this region is related to a Al 1s to Al 3d ($t_2$) transition. The Al 3d rarely involves in bonding directly but this more diffused orbital can collapse towards the core and increases its overlap with the 1s orbital (hence intensity) if it senses an increase in the coulomb potential.

Conclusions

The two samples OTS and UPQ2TSY have been investigated with X-ray absorption spectroscopy at the Al K-edge. This technique allows for the probing of the electronic structure of Al and its immediate surrounding and is very sensitive to changes of the local structure (neighbouring atoms) surrounding the Al atom in the solid. Our investigation of the two samples prepared in accordance with the invention indicates that they exhibit noticeable difference in their Al K-edge absorption spectrum. In particular, there appears to be a noticeable difference between the samples, OTS and UPQ2TSY in the near edge region of the Si K-edge spectrum. The difference may be attributed to a change in the Al local environment between the two samples. The change affects the outer unoccupied orbitals of Al which the K-edge absorption spectroscopy is probing. Thus it appears that the technique can be used to monitor the microscopic change as the result of the processing.

EXAMPLE 9

The following tests were performed on alumina samples (treated-UPQ2TS,UPQ-2CE and untreated-OTS, OCE):

Density, ultrasonic velocity, capacitance and dielectric loss measurements.

Calculation of elastic modulii, Poison's ratio and dielectric constant.

Ultrasonic C-Scan.

Conclusions

Density of the treated alumina samples UPQ2TS, UPQOCE) increased by 0.31 and 0.38% when compared with original samples OTS, OCE respectively. All sample showed some degree of anisotropy but increased with the treated sample, especially in y-direction. The Poisson's ratio especially in the y-direction de-creased thus increasing the stiffness (grinding will be harder) in the direction with the treated sample. Young's Modulus value was higher (0.2%) with the treated sample.

Ultrasonic velocity behaviour also suggests that the specific heat of the treated sample should show higher value. Dielectric value of the sample showed unusual behaviour at different frequencies especially the loss factor. The dielectric constant at different frequencies decreased (11–12%) with the treatment for the OTS samples. The loss factor at frequency >5 KHz increased with the treatment of OTS samples. The Dielectric behaviour for OCE and UPQ2CE was different than OTS and UPQ2TS samples. The dielectric constant value remained almost similar, however the loss factor increased with the treatment at frequencies >5 KHz. Impedance of the treated (OTS) and untreated (UP2TS and TO2S) alumina samples were measured at 501° C. from 0.5–10 MHz. The real and imaginary impedance of the samples clearly show the change in values after the treatment. The resultant conductive and capacitive components, calculated from the ZRES program using parallel R/C equivalent circuit, changes with the treatment. The low capacitance value suggests that the impedance arose from the bulk sample, including the grain plus grain boundary. The low resistivity of the treated alumina sample (O2TS) suggests that conductance occurs due to an increase in the concentration of defects (e.g. dislocation or charge carrier) or changes in the grain structure with the sample treatment.

For example, the manufacture of computer micro-chips is particularly well suited to the adaptation and consequent benefits of the present process, as in certain applications a higher thermal expansion than normal is desirable to offset the expansion of other materials used to complete a microchip assembly. In other cases the reverse is more desirable, such as in the instance of silicon which has a lower thermal expansion. The combination of the increase of thermal shock resistance and the improvement of anisotropic and electrical properties, contributes to the advantages of the present invention.

This invention may be embodied in other forms or carried out in other ways without departing from the spirit or essential characteristics thereof. The present disclosure is therefore to be considered as in all respects illustrative and not restrictive, the scope of the invention being indicated by the appended Claims, and all changes which come within the meaning and range of equivalency are intended to be embraced therein.

What is claimed is:

1. A method for the treatment of a formed ceramic structure to change its properties and to develop an improved combination of a high apparent density ranging from about 95% to 100% of theoretical density, a porosity ranging from about 5% to 0%, increased modulus of elasticity and increased thermal shock resistance as measured by the ability of said structure to withstand a change in its temperature of at least 300° C. such as may be caused by the rapid upquenching thereof, said method comprising:

(A) subjecting said ceramic structure to at least one first heat treatment to promote the formation of controlled macro- and micro-fracture domains therein, by heating said ceramic structure from 20° C. to a maximum temperature of about 1200° C., and thereafter cooling said ceramic structure to a temperature of about 20° C.;

(B) subjecting the ceramic structure treated in accordance with Step (A) to at least one second heat treatment while placing said ceramic structure under pressure or stress to cause the conversion of the ceramic structure to a polycrystalline form with modified atomic structure and chemical bonds, said second heat treatment performed by following steps:

(i) applying a tangential stress or pressure to said ceramic structure ranging from about 15 psi to about 400,000 psi;

(ii) concurrently with step (i), adjusting the temperature of said ceramic structure to a level of from about 20° C. to about 1200° C.; and (iii) performing the treatment in accordance with the conditions of Steps (i) and (ii) at a frequency of at least once and for a period sufficient to reach temperature equilibrium within said ceramic structure.

2. The method of claim 1 wherein said maximum pressure is on the order of 400,000 psi.

3. The method of claim 1 wherein said ceramic material comprises alumina.

4. The method of claim 3 wherein said alumina is present in an amount of at least 85 wt %.

5. The method of claim 3 wherein said alumina is present in an amount of at least 96 wt %.

6. The method of claim 3 wherein said alumina is present in an amount of at least 98.8 wt %.

7. The method of claim 1 wherein said ceramic material comprises a mixture of alumina and a material selected from the group consisting of zirconia, magnesia, silica, calcia, and mixtures thereof.

8. A method for the preparation of a ceramic structure to change its properties and to develop an improved combination of a high apparent density ranging from about 95% to 100% of theoretical density, a porosity ranging from about 5% to 0%, increased modulus of elasticity and increased thermal shock resistance as measured by the ability of said structure to withstand a chance in its temperature of at least 300° C. such as may be caused by the rapid upquenching thereof, said method comprising:

(A) forming said ceramic structure and subjecting it to at least one first heat treatment to promote the formation of controlled macro- and micro-fracture domains therein, by heating said ceramic structure from 20° C. to a maximum temperature of about 1200° C., cooling said ceramic structure to a temperature of about 20° C.;

(B) subjecting the ceramic structure treated in accordance with Step (A) to at least one second heat treatment while placing said ceramic structure under pressure or stress to cause the conversion of the ceramic structure to a polycrystalline form with modified atomic structure and chemical bonds at the grains and the grain boundaries, said second heat treatment performed by following steps:

(i) applying a tangential stress or pressure to said ceramic structure ranging from about 15 psi to about 400,000 psi;

(ii) concurrently with step (i), adjusting the temperature of said ceramic structure to a level of from about 20° C. to about 1200° C.; and (iii) performing the treatment in accordance with the conditions of Steps (i) and (ii) at a frequency of at least once and for a period sufficient to reach temperature equilibrium within said ceramic structure.

9. The method of claim 8 wherein Step (B) is performed by:

(i) applying a pressure or stress to the ceramic structure of Step (A) on the order of 50,000 psi as determined in relation to the size and shape of said ceramic structure, and a particular K factor relating to modulus of elasticity;

(ii) concurrently with step (i), adjusting the temperature of said ceramic structure to a level on the order of 650° C. or other source of energy of activation up to and exceeding the elastic limit of said material, as determined in relation to alumina and to a particular K factor relating to the heat capacity, thermal conductivity and thermal expansion of the ceramic structure; and (iii) performing the treatment in accordance with the conditions of Steps (i) and (ii) at a frequency of at least once and for a period sufficient to reach temperature equilibrium within said ceramic structure, and to thereby achieve a pressure parameter of at least the magnitude of Step (i).

10. The method of claim 9 wherein said first heat treatment is conducted by heating said structure to a temperature of about 1200° C., cooling said structure to a temperature of about 20° C., and thereafter drying said cooled structure and said second heat treatment is conducted by heating said structure processed in accordance with Step (A) to a temperature ranging up to about 1200° C. and at a pressure or stress from about 10,000 psi to about 280,000 psi, followed by rapidly cooling said structure to ambient temperature while under said pressure.

11. The method of claim 10 wherein said first heat treatment is conducted at a temperature of about 675° C. and said second heat treatment is conducted at a temperature of about 660° C. and at a pressure ranging from about 60,000 psi to about 150,000 psi.

12. The method of claim 11 wherein said pressure is about 90,000 psi.

13. The method of claim 10 wherein said pressure is at least 90,000 psi.

14. The method of claim 9 wherein said first heat treatment is conducted by heating said structure to a maximum temperature of about 1200° C., cooling said structure to a temperature of about 20° C. and thereafter drying said cooled structure.

15. The method of claim 8 wherein said first heat treatment is conducted by heating said structure to a maximum temperature of about 1200° C., cooling said structure to a temperature of about 20° C., and thereafter drying said cooled structure.

16. The method of claim 8 wherein said second heat treatment is conducted by heating said structure processed in accordance with Step (A) to a temperature ranging up to about 1200° C.; and at a pressure or stress of up to about 280,000 psi, followed by rapidly cooling said structure to ambient temperature while under said pressure.

17. The method of claim 16 wherein said pressure is at least 90,000 psi.

18. The method of claim 8 wherein said ceramic structure is prepared from a material selected from the group consisting of alumina, zirconia, titania, thoria, silica, magnesia, calcia, nitrides thereof, carbides thereof, aluminum nitride, silicon nitride, boron nitride, boron carbide, and mixtures thereof.

19. The method of claim 18 wherein said material is selected from the group consisting of alumina, aluminum nitride and silicon nitride.

20. The method of claim 18 wherein said material comprises a mixture of alumina and a material selected from the group consisting of zirconia, magnesia, silica, calcia, and mixtures thereof.

* * * * *